United States Patent
Sato

(10) Patent No.: US 11,885,383 B2
(45) Date of Patent: Jan. 30, 2024

(54) DISC BRAKE PAD

(71) Applicant: AKEBONO BRAKE INDUSTRY CO., LTD., Tokyo (JP)

(72) Inventor: Keito Sato, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 133 days.

(21) Appl. No.: 17/395,514

(22) Filed: Aug. 6, 2021

(65) Prior Publication Data

US 2022/0042562 A1 Feb. 10, 2022

(30) Foreign Application Priority Data

Aug. 7, 2020 (JP) ................. 2020-134921

(51) Int. Cl.
*F16D 65/097* (2006.01)
(52) U.S. Cl.
CPC .................. *F16D 65/0972* (2013.01)
(58) Field of Classification Search
CPC ............ F16D 65/0972; F16D 65/0977; F16D 2055/008; F16D 55/227; F16D 2055/0041; B60T 1/065
See application file for complete search history.

(56) References Cited

U.S. PATENT DOCUMENTS 5,064,028 A * 11/1991 Antony ............... F16D 65/0977
188/73.38
10,316,912 B2   6/2019 Crippa et al.
2007/0261927 A1  11/2007 Iraschko et al.
2011/0180354 A1   7/2011 Wagner et al.
2020/0096065 A1   3/2020 Lim et al.
(Continued)

FOREIGN PATENT DOCUMENTS

CN    101581344 A    11/2009
JP    S56-060833 U    5/1981
JP    2008-519208 T   6/2008
(Continued)

OTHER PUBLICATIONS

WO document No. 2015/155708 published Oct. 15, 2015 to Crippa et al.*

(Continued)

*Primary Examiner* — Pamela Rodriguez
(74) *Attorney, Agent, or Firm* — Faegre Drinker Biddle Reath LLP

(57) ABSTRACT

A disc brake pad which is supported by a pair of pins to a pad support member so that the disc brake pad is movable in an axial direction, include a lining and a back plate supporting a back surface of the lining. The back plate includes a clip insertion portion where part of a pad clip is inserted in the axial direction, at an intermediate portion of a radially outer side portion in a circumferential direction, includes pin insertion portions where the pins are respectively inserted in the axial direction, at both sides of the radially outer side portion in the circumferential direction with the clip insertion portion located therebetween. The clip insertion portion includes, on a radially outer side portion of an inner peripheral surface thereof, a pressed surface where a pressing force directed radially outward is applied from the pad clip.

12 Claims, 20 Drawing Sheets

(56) References Cited

U.S. PATENT DOCUMENTS

2021/0396283 A1* 12/2021 Ishiguro .............. F16D 65/183

FOREIGN PATENT DOCUMENTS

| JP | 2009-041769 | 2/2009 |
| JP | 2009-264413 A | 11/2009 |
| JP | 2010-101463 A | 5/2010 |
| JP | 2011-163444 A | 8/2011 |
| JP | 2011-220402 A | 11/2011 |
| JP | 2017-133588 | 8/2017 |
| JP | 2019-184070 A | 10/2019 |

OTHER PUBLICATIONS

European Patent No. EP 3104035 published Dec. 14, 2016 to Freund et al.*
Extended European Seasrch Report dated Jan. 18, 2022 in European Patent Application No. 21189628.7.
Chinese Office Action dated Apr. 15, 2023 in Application No. 202110909738.X.
Japanese Office Action dated Dec. 5, 2023 in Application No. 2020-134921.

* cited by examiner

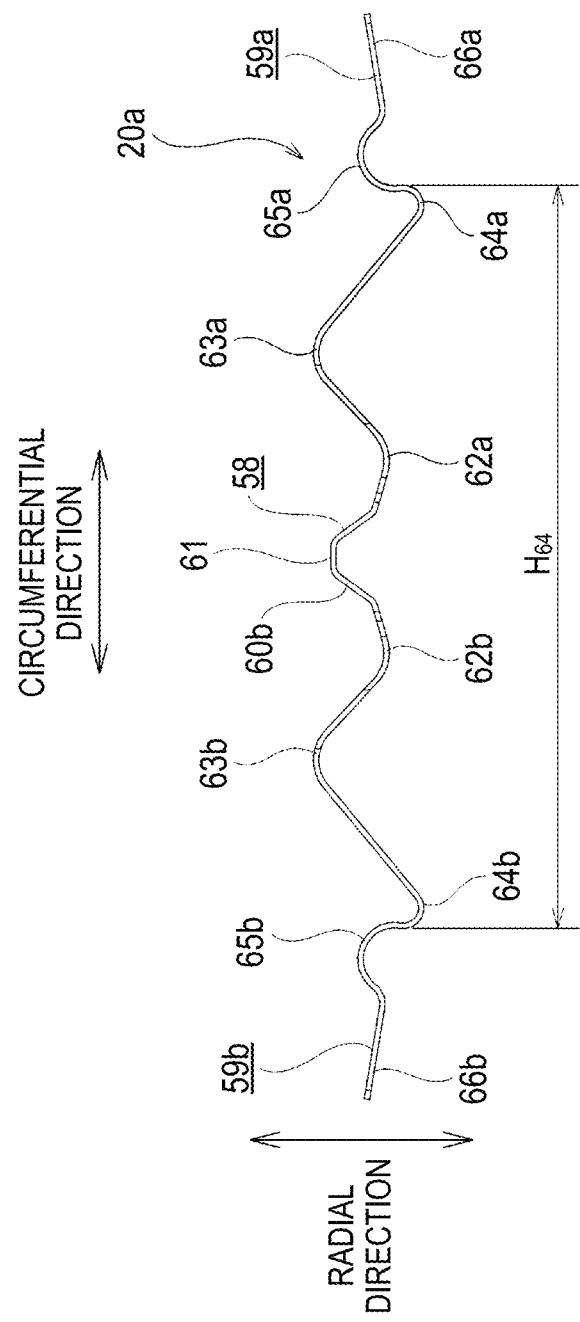

DISC BRAKE PAD

CROSS-REFERENCE TO RELATED APPLICATIONS

The disclosure of Japanese Patent Application No. 2020-134921 filed on Aug. 7, 2020, including specification, drawings and claims is incorporated herein by reference in its entirety.

TECHNICAL FIELD

The present invention relates to a disc brake pad.

BACKGROUND ART

A disc brake device obtains a braking force by pressing a pad, which is supported by a pad support member so as to be movable in an axial direction, against a side surface of a rotor in the axial direction. In such a disc brake device, various structures have been proposed in related-art as a pad support structure for supporting the pad so as to be movable in the axial direction with respect to the pad support member.

FIGS. 18 and 19 show a disc brake device 1 having a related-art structure including a pad support structure using a pin, which is disclosed in Patent Literature 1. The disc brake device 1 is an opposed piston type disc brake device, and includes a caliper 2 serving as a pad support member, an inner pad 3 and an outer pad 4.

The caliper 2 each supports the inner pad 3 and the outer pad 4 so as to be movable in an axial direction (an upper-lower direction in FIG. 18 and a front-back direction in FIG. 19). The caliper 2 includes an inner body 6 and an outer body 7 that are disposed on both sides of a rotor 5 in the axial direction, a first coupling portion 8, a second coupling portion 9 and a third coupling portion 10 that each couple the inner body 6 and the outer body 7 in the axial direction, and a pair of pins 11a, 11b that are bridged between the inner body 6 and the outer body 7.

In the disc brake device 1, the axial direction, a circumferential direction and a radial direction refer to an axial direction, a circumferential direction and a radial direction of the rotor 5 unless otherwise specified.

Each of the inner body 6 and the outer body 7 has overhanging wall portions 12a, 12b overhanging toward the rotor 5 in the axial direction at both side portions in the circumferential direction. The overhanging wall portions 12a, 12b respectively include flat surface-shaped torque receiving surfaces 13a, 13b on side surfaces in the circumferential direction, the side surfaces facing each other in the circumferential direction. The first coupling portion 8 and the second coupling portion 9 each couple end portions of the inner body 6 and the outer body 7 in the circumferential direction to each other in the axial direction, and the third coupling portion 10 couples intermediate portions of the inner body 6 and the outer body 7 in the circumferential direction to each other in the axial direction. The first coupling portion 8 and the second coupling portion 9 respectively include flat surface-shaped moment bearing surfaces 14a, 14b on side surfaces in the circumferential direction, the side surfaces facing the third coupling portion 10 in the circumferential direction. Each of the inner body 6 and the outer body 7 includes cylinders, and pistons are respectively fitted in the cylinders so as to be movable in the axial direction.

Each of the pair of pins 11a, 11b has a cylindrical shape and is disposed parallel to a central axis of the rotor 5. End portions of the pair of pins 11a, 11b in the axial direction are each supported by radially outer side portions of the inner body 6 and the outer body 7. Therefore, the pair of pins 11a, 11b are bridged between the inner body 6 and the outer body 7.

Each of the inner pad 3 and the outer pad 4 includes a lining 15 and a back plate 16 supporting a back surface of the lining 15. The back plate 16 includes pin insertion portions 17a, 17b at two positions separated from each other in the circumferential direction at a radially outer side portion. Each of the pin insertion portions 17a, 17b is a through hole penetrating in the axial direction. In a shown example, each of the pin insertion portions 17a, 17b has an elliptical shape. A radial width dimension and a circumferential width dimension of each of the pin insertion portions 17a, 17b are larger than an outer diameter of each of the pins 11a, 11b.

The back plate 16 has torque transmission surfaces 18a, 18b and moment transmission surfaces 19a, 19b respectively on both side surfaces in the circumferential direction. The torque transmission surfaces 18a, 18b are respectively provided on radially inner side portions of the side surfaces of the back plate 16 in the circumferential direction. The moment transmission surfaces 19a, 19b are respectively provided on radially outer side portions of the side surfaces of the back plate 16 in the circumferential direction.

In the pair of pin insertion portions 17a, 17b, one pin 11a disposed on one side in the circumferential direction is inserted in the axial direction into one pin insertion portion 17a disposed on the one side in the circumferential direction (a rotation-in side when moving forward), and the other pin 11b disposed on the other side in the circumferential direction is inserted in the axial direction into the other pin insertion portion 17b disposed on the other side in the circumferential direction (a rotation-out side when moving forward). Thereby, the inner pad 3 and the outer pad 4 are supported by the caliper 2 so as to be movable in the axial direction by using the pair of pins 11a, 11b.

The disc brake device 1 further includes a pad clip 20 in order to prevent rattling of the inner pad 3 and the outer pad 4 during non-braking. The pad clip 20 is made of a metal plate and includes a substrate portion 21, a pair of first pad pressing portions 22a, 22b, a pair of second pad pressing portions 23a, 23b, a first pin pressing portion 24, and a second pin pressing portion 25.

The substrate portion 21 is disposed at an intermediate portion of the pad clip 20 in the circumferential direction. The pair of first pad pressing portions 22a, 22b are disposed on one side portion of the pad clip 20 in the circumferential direction so as to be separated from each other in the axial direction, and extend in the circumferential direction from an end portion of the substrate portion 21 on the one side in the circumferential direction. The pair of second pad pressing portions 23a, 23b are disposed on the other side portion of the pad clip 20 in the circumferential direction so as to be separated from each other in the axial direction, and extend in the circumferential direction from an end portion of the substrate portion 21 on the other side in the circumferential direction. The first pin pressing portion 24 is disposed between the first pad pressing portions 22a, 22b, and extends in the circumferential direction from the end portion of the substrate portion 21 on the one side in the circumferential direction. The second pin pressing portion 25 is disposed between the second pad pressing portions 23a, 23b, and extends in the circumferential direction from the end portion of the substrate portion 21 on the other side in the circumferential direction.

In a mounted state of the pad clip 20, the substrate portion 21 is disposed on a radially inner side of the third coupling portion 10. The first pin pressing portion 24 pushes up the pin 11a on the one side in the circumferential direction toward a radially outer side, and the pair of first pad pressing portions 22a, 22b press one side portion of an outer peripheral edge portion of each of the inner pad 3 and the outer pad 4 in the circumferential direction toward a radially inner side. The second pin pressing portion 25 pushes up the pin 11b on the other side in the circumferential direction toward the radially outer side, and the pair of second pad pressing portions 23a, 23b press the other side portion of the outer peripheral edge portion of each of the inner pad 3 and the outer pad 4 in the circumferential direction toward the radially inner side.

Thereby, a posture of each of the inner pad 3 and the outer pad 4 is stabilized, and occurrence of a rattling noise (an abnormal noise) due to rattling of the inner pad 3 and the outer pad 4 during non-braking is prevented. In the disc brake device 1 having the related-art structure, radially outer side portions of inner peripheral surfaces of the pin insertion portions 17a, 17b are respectively pressed against radially outer side end portions of the pins 11a, 11b by pressing forces of the pad clip 20. Therefore, a gap is formed between a radially inner side portion of the inner peripheral surface of each of the pin insertion portions 17a, 17b and a radially inner side end portion of each of the pins 11a, 11b.

The pad clip 20 presses the pin 11b on the other side in the circumferential direction toward the one side in the circumferential direction by a third pin pressing portion 26 provided at a tip end portion of the second pin pressing portion 25. Thereby, each of the inner pad 3 and the outer pad 4 is pressed toward the other side in the circumferential direction by using a third pad pressing portion 27 provided at tip end portions of the first pad pressing portions 22a, 22b. The torque transmission surface 18b provided on a side surface of each of the inner pad 3 and the outer pad 4 on the other side in the circumferential direction is brought into contact with the torque receiving surface 13b provided on each of the inner body 6 and the outer body 7. Thereby, during forward braking, the torque transmission surface 18b and the torque receiving surface 13b are prevented from vigorously colliding with each other to cause an abnormal noise.

Patent Literature 1: JP-A-2011-163444

SUMMARY OF INVENTION

A disc brake pad, according to the present invention, which is supported by a pair of pins to a pad support member so that the disc brake pad is movable in an axial direction of a rotor, the disc brake pad includes: a lining; and a back plate supporting a back surface of the lining.

The back plate includes a clip insertion portion into which a part of a pad clip is inserted in the axial direction, at an intermediate portion of a radially outer side portion in a circumferential direction of the rotor.

The back plate includes pin insertion portions into which the pins are respectively inserted in the axial direction, at both sides of the radially outer side portion in the circumferential direction with the clip insertion portion located between the pin insertion portions.

The clip insertion portion includes, on a radially outer side portion of an inner peripheral surface of the clip insertion portion, a pressed surface to which a pressing force directed outward in a radial direction of the rotor is applied from the pad clip.

In the disc brake pad according to one aspect of the present invention, the pressed surface may be a flat surface.

Alternatively, the pressed surface may be a concave curved surface or a convex curved surface.

In the disc brake pad according to one aspect of the present invention, the back plate may include the clip insertion portion at a central portion of the radially outer side portion in the circumferential direction.

In the disc brake pad according to one aspect of the present invention, the back plate may include a central protrusion protruding outward in the radial direction from portions adjacent to the both sides in the circumferential direction, at the central portion of the radially outer side portion in the circumferential direction, and the clip insertion portion may be provided in the central protrusion.

In the disc brake pad according to one aspect of the present invention, each of the lining and the back plate may have a line-symmetric shape with respect to a symmetry axis passing through a central portion in the circumferential direction.

Alternatively, each of the lining and the back plate may have a non-line-symmetric shape with respect to a symmetry axis passing through a central portion in the circumferential direction.

In the disc brake pad according to one aspect of the present invention, the back plate may include a flat surface-shaped torque transmission surface that transmits a brake tangential force to the pad support member, on a radially inner side portion of a side surface on a rotation-out side, and include a flat surface-shaped moment transmission surface that supports a moment in a direction in which a rotation-in side portion is pushed up toward a radially outer side by abutting the pad support member, on a radially outer side portion of the side surface on the rotation-out side.

In this case, each of the torque transmission surface and the moment transmission surface may be provided on a tip end surface of a protruding portion protruding in the circumferential direction.

In the disc brake pad according to one aspect of the present invention, the clip insertion portion may be a through hole that opens only on both sides of the back plate in the axial direction.

Alternatively, the clip insertion portion may be a notch that opens on both sides of the back plate in the axial direction and opens on a side of the back plate in a radial direction or the circumferential direction.

Further, the clip insertion portion may be a bottomed hole that opens only on a surface side (a rotor side) of the back plate.

In the disc brake pad according to one aspect of the present invention, a circumferential clip that is elastically deformed in the circumferential direction between the back plate and the pad support member may be fixed to the back plate.

In this case, the circumferential clip may be fixed to the radially inner side portion of the back plate.

Further, the circumferential clip may be fixed to each of both side portions of the back plate in the circumferential direction.

In the disc brake pad according to one aspect of the present invention, the pin insertion portion may be a through hole that opens only on both sides of the back plate in the axial direction.

Alternatively, the pin insertion portion may be a notch that opens on both sides of the back plate in the axial direction and opens in the radial direction or the circumferential direction of the back plate.

BRIEF DESCRIPTION OF DRAWINGS

FIG. 13 is a front view showing a pad clip taken out from the disc brake device according to the first embodiment.

DESCRIPTION OF EMBODIMENTS

Figure 1:
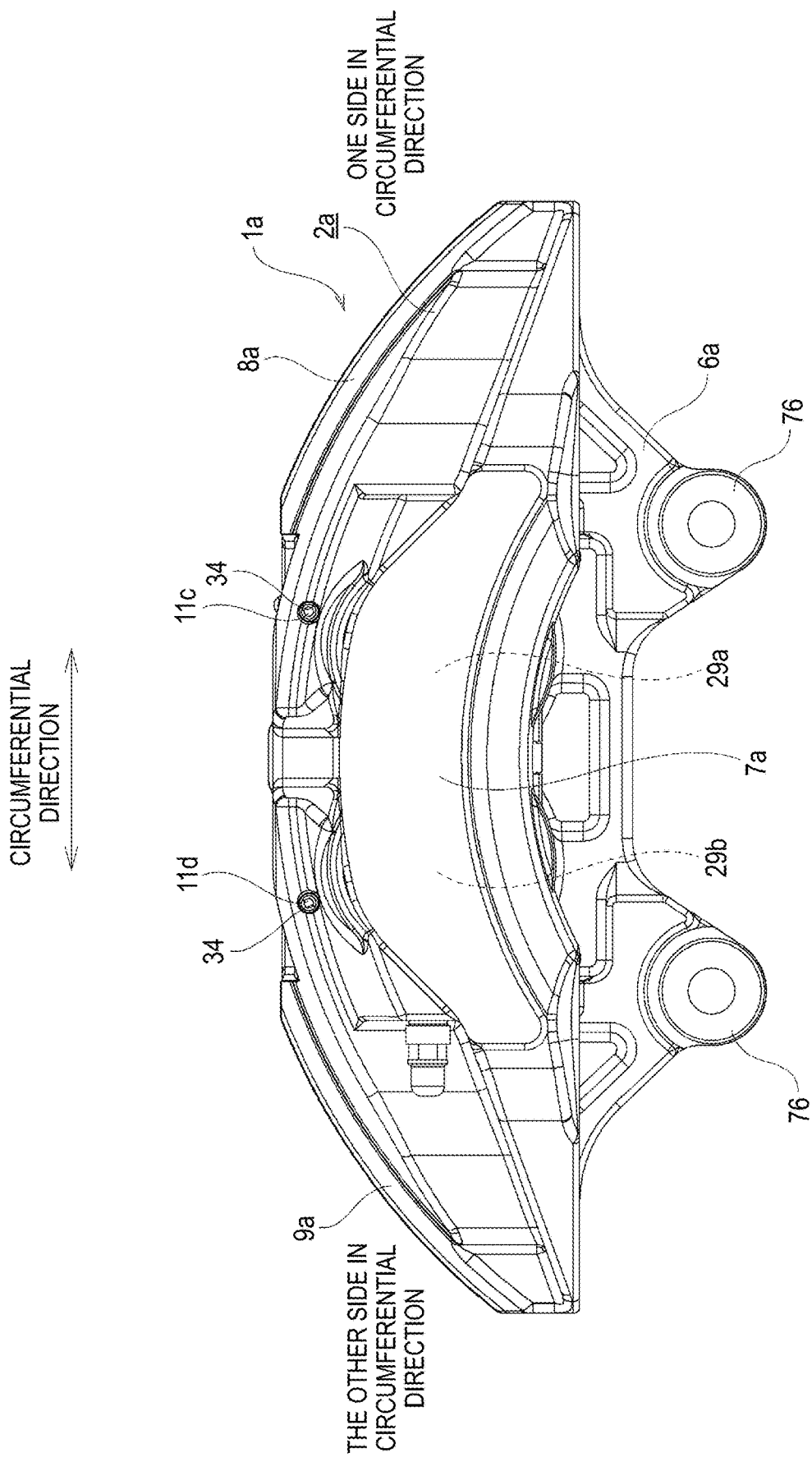
FIG. 1 is a front view showing a disc brake device according to a first embodiment.

In the disc brake device 1 having the related-art structure, the posture of each of the inner pad 3 and the outer pad 4 is unstable during so-called light braking in which brake fluid has a low hydraulic pressure and a pressing force of the lining 15 against the rotor 5 is reduced, for example, at the time of switching between forward and reverse movement in a parking lot or during deceleration traveling, and thus a brake noise may occur.

Figure 19:
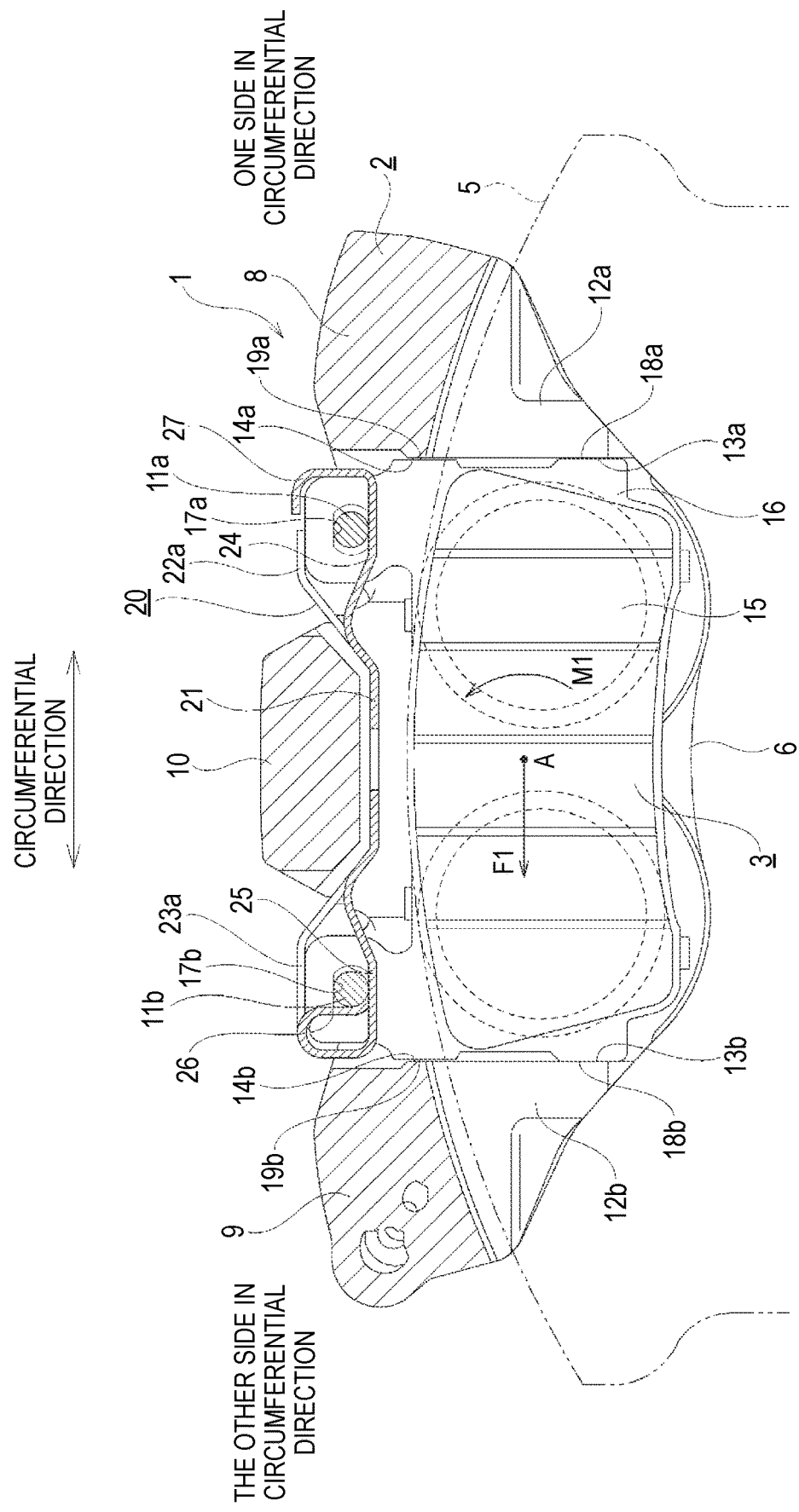
FIG. 19 is a cross-sectional view taken along a line E-E in FIG. 18.

That is, in the disc brake device 1, as shown in FIG. 19, during forward braking, a brake tangential force F1 directed to the other side in the circumferential direction (a left side in FIG. 19 and the rotation-out side when moving forward) acts on a point A at a friction surface center of the lining 15 constituting the inner pad 3 (the outer pad 4). Then, the brake tangential force F1 is supported by an abutting portion between the torque transmission surface 18b and the torque receiving surface 13b that are disposed radially inward than a line of action of the brake tangential force F1. Therefore, during forward braking, a moment M1 that attempts to rotate the inner pad 3 (the outer pad 4) counterclockwise acts on the inner pad 3 (the outer pad 4).

The moment M1 is supported by rotating the inner pad 3 (the outer pad 4) counterclockwise and bringing the moment transmission surface 19b disposed on the other side in the circumferential direction into abutting the moment bearing surface 14b. However, since the moment M1 acting on the inner pad 3 (the outer pad 4) is small during light braking, it is difficult to bring the moment transmission surface 19b into abutting the moment bearing surface 14b against an elastic force of the pad clip 20.

Specifically, when the moment M1 is reduced, the first pad pressing portion 22a (22b) overcomes a force of pressing the outer peripheral edge portion of the inner pad 3 (the outer pad 4) toward the radially inner side, and it is difficult to rotate the inner pad 3 (the outer pad 4) counterclockwise. Therefore, the moment transmission surface 19b and the moment bearing surface 14b are separated from each other, and the posture of the inner pad 3 (the outer pad 4) is unstable. As a result, the brake noise is likely to occur. Such a problem of the brake noise occurs not only during forward braking but also during reverse braking.

In view of such circumstances, an inventor of the present invention have come up with a novel idea that the above-described problem can be solved by applying a pressing force directed radially outward to a pad by using a pad clip in order to make it easy to rotate the pad in an acting direction of a moment even during light braking. However, in the pad suspended by the caliper by using the pair of pins, there arises a new problem that it is difficult to ensure an area of the lining or to avoid interference with other members due to a position of a portion to which the pressing force is applied by the pad clip.

The present invention has been made to solve the above problems, and an object of the present invention is to provide a disc brake pad that has a structure capable of being suspended from a pad support member by a pair of pins, and that can apply a pressing force directed radially outward by a pad clip while ensuring an area of a lining and avoiding interference with other members.

First Embodiment

A first embodiment will be described with reference to FIGS. 1 to 16C.

[Overall Configuration of Disc Brake Device]

A disc brake device 1a according to the present embodiment is an opposed piston type disc brake device used for braking an automobile, and includes a caliper 2a corresponding to a pad support member, an inner pad 3a and an outer pad 4a corresponding to pads, and a pad clip 20a.

Figure 2:
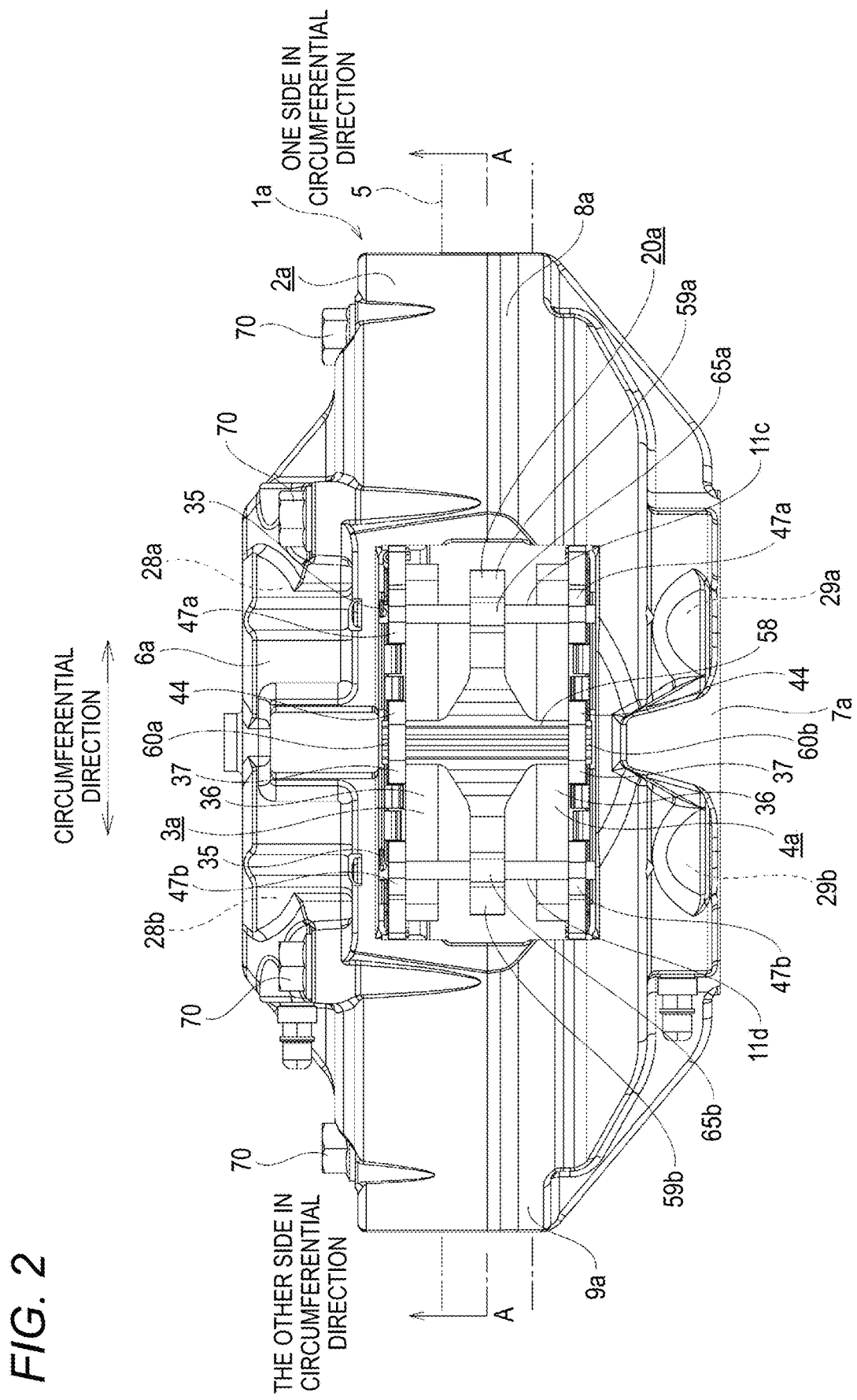
FIG. 2 is a plan view showing the disc brake device according to the first embodiment.
Figure 3:
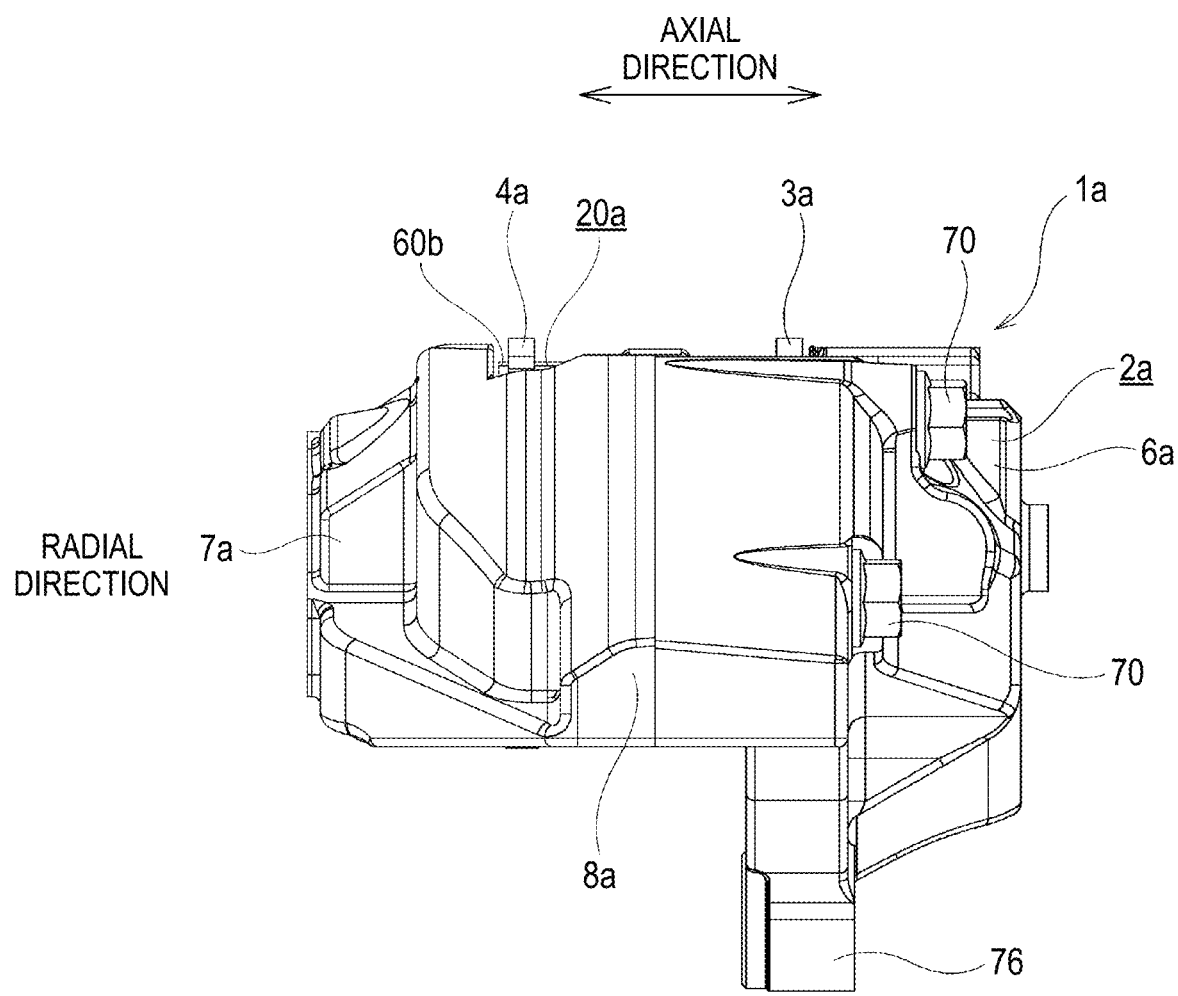
FIG. 3 is a side view showing the disc brake device according to the first embodiment.
Figure 11:
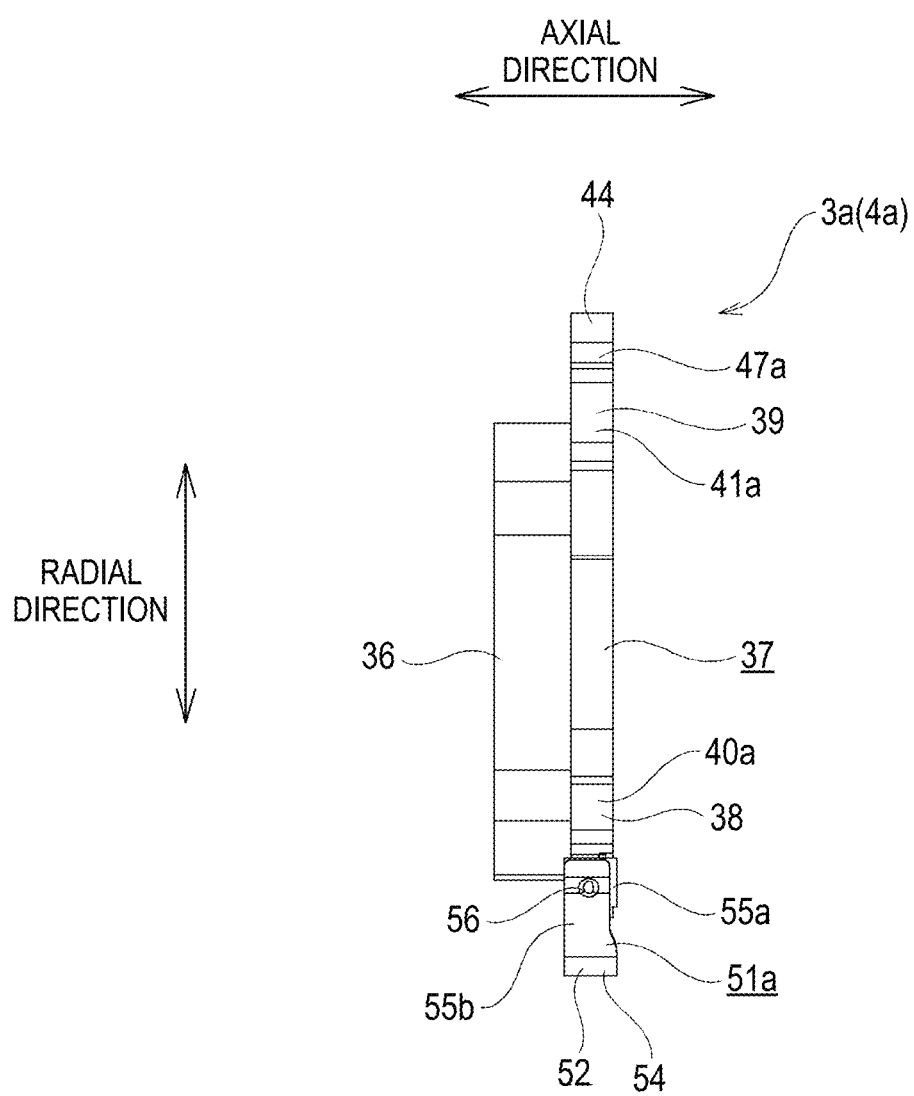
FIG. 11 is a side view showing the inner pad (the outer pad) taken out from the disc brake device according to the first embodiment.
Figure 14:
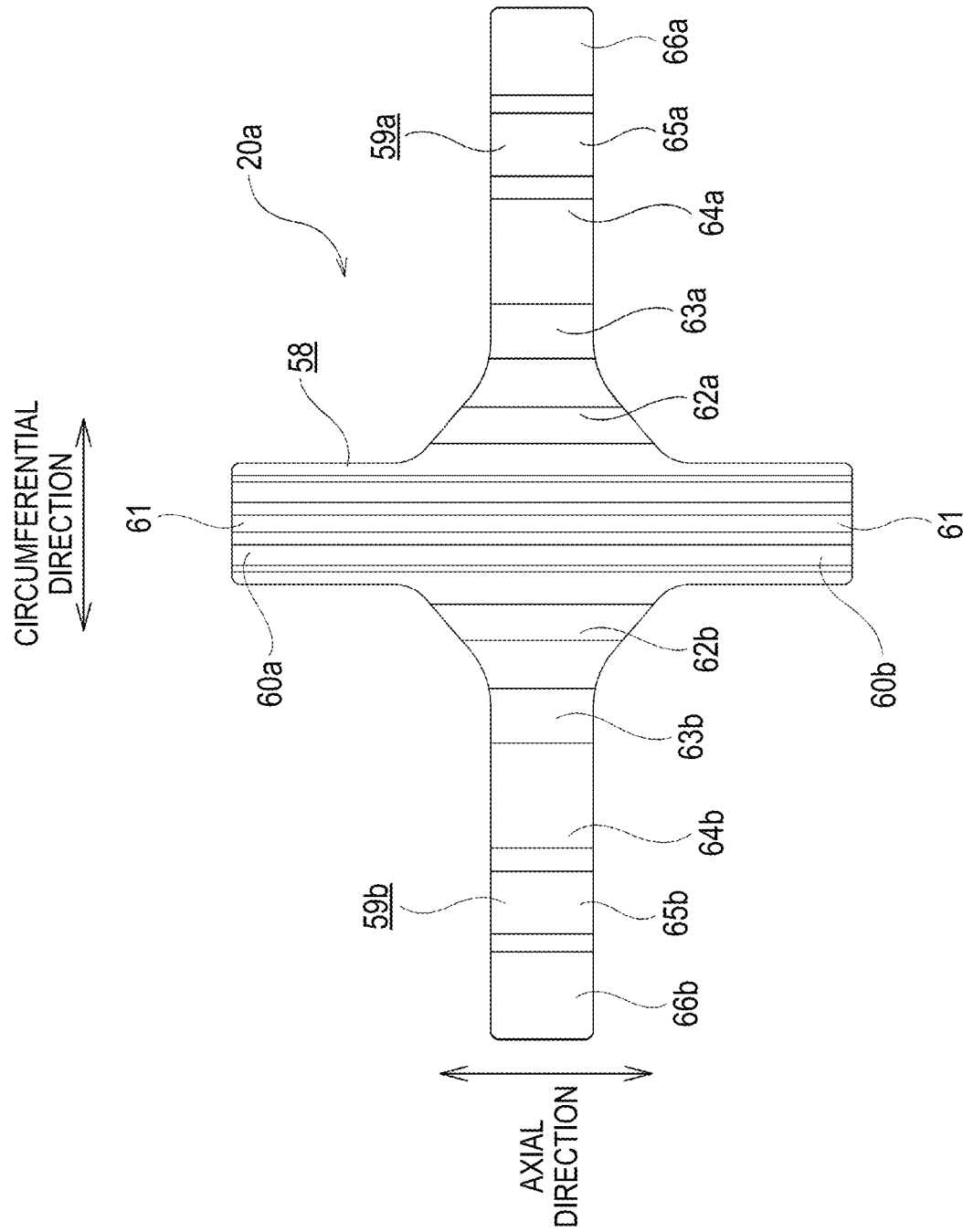
FIG. 14 is a plan view showing the pad clip taken out from the disc brake device according to the first embodiment.
Figure 15:
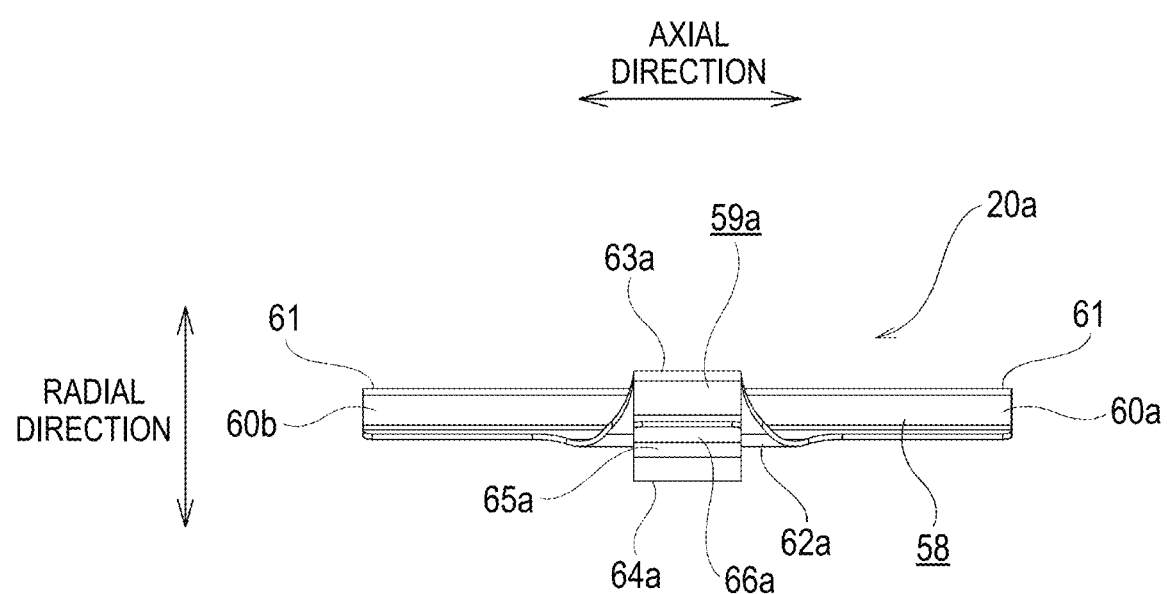
FIG. 15 is a side view showing the pad clip taken out from the disc brake device according to the first embodiment.

In the present embodiment, an axial direction, a circumferential direction and a radial direction refer to an axial direction, a circumferential direction and a radial direction of a disc-shaped rotor 5 that rotates together with wheels unless otherwise specified (see FIG. 2). A front-back direction in FIGS. 1, 5 to 10, 12A, 12B, 13 and 16A, 16B, 16C, an upper-lower direction in FIGS. 2 and 14, and a left-right direction in FIGS. 3, 11 and 15 correspond to the axial direction. A side close to the rotor 5 in the axial direction is referred as an axially inner side, and a side far from the rotor 5 in the axial direction is referred as an axially outer side. A left-right direction in FIGS. 1, 2, 5 to 10, 12A, 12B, 13, 14 and 16A, 16B, 16C, and a front-back direction in FIGS. 3, 11 and 15 correspond to the circumferential direction. A right side in FIGS. 1, 2, 5 to 9, 12A, 13, 14 and 16A, 16B, 16C, a left side in FIGS. 10 and 12B, and a front side in FIGS. 3 and 11 are referred to as one side in the circumferential direction, and a left side in FIGS. 1, 2, 5 to 9, 12A, 13, 14 and 16A, 16B, 16C, a right side in FIGS. 10 and 12B, and a back side in FIGS. 3 and 11 are referred to as the other side in the circumferential direction. In the present embodiment, the one side in the circumferential direction is a rotation-in side when a vehicle is moving forward and a rotation-out side when the vehicle is moving reversely, and the other side in the circumferential direction is a rotation-out side when the vehicle is moving forward and a rotation-in side when the vehicle is moving reversely. An upper-lower direction in FIGS. 1, 3, 5 to 13, 15 and 16A, 16B, 16C, and a front-back direction in FIGS. 2 and 14 correspond to the radial direction. An upper side in FIGS. 1, 3, 5 to 13, 15 and 16A, 16B, 16C, and a front side in FIGS. 2 and 14 are a radially outer side, and a lower side in FIGS. 1, 3, 5 to 13, 15 and 16A, 16B, 16C, and a back side in FIGS. 2 and 14 are a radially inner side. The rotation-in side refers to a side on which the rotor 5 enters the caliper 2a, and the rotation-out side refers to a side on which the rotor 5 exits from the caliper 2a.

[Caliper]

The caliper 2a has a substantially bow shape as viewed in the axial direction. The caliper 2a is fixed to a vehicle body and supports the inner pad 3a and the outer pad 4a so as to be movable in the axial direction. The caliper 2a is disposed so as to cover a part of the rotor 5 in the circumferential direction from the radially outer side, and is supported and fixed to a knuckle constituting a suspension device. The caliper 2a is molded by casting a material made of light alloy such as aluminum alloy, or iron-based alloy. The caliper 2a has a split type structure in which an inner side member and an outer side member are coupled by a plurality of bolts 70. The caliper 2a includes an inner body 6a, an outer body 7a, a first coupling portion 8a, a second coupling portion 9a and a pair of pins 11c, 11d.

The inner body 6a and the outer body 7a are disposed on both sides of the rotor 5 in the axial direction so as to sandwich the rotor 5. The inner body 6a is disposed on an inner side (a center side) in a width direction of the vehicle with respect to the rotor 5, and includes a first inner cylinder 28a on the one side in the circumferential direction (the right side in FIG. 2, the rotation-in side when moving forward and the rotation-out side when moving reversely), and a second inner cylinder 28b on the other side in the circumferential direction (the left side in FIG. 2, the rotation-out side when moving forward and the rotation-in side when moving reversely). The inner body 6 includes a pair of attachment portions 76 for fixing the inner body 6a to the vehicle body, at a radially inner side portion. The outer body 7a is disposed on an outer side in the width direction of the vehicle with respect to the rotor 5, and includes a first outer cylinder 29a on the one side in the circumferential direction and a second outer cylinder 29b on the other side in the circumferential direction.

The first inner cylinder 28a and the first outer cylinder 29a are coaxially disposed so as to face each other in the axial direction, and the second inner cylinder 28b and the second outer cylinder 29b are coaxially disposed so as to face each other in the axial direction. The first inner cylinder 28a and the second inner cylinder 28b communicate with each other through an oil passage (not shown) provided inside the inner body 6a. The first outer cylinder 29a and the second outer cylinder 29b communicate with each other through an oil passage (not shown) provided inside the outer body 7a. A piston (not shown) is fitted to each of the four cylinders 28a, 28b, 29a, 29b so as to be displaceable in the axial direction.

Figure 5:
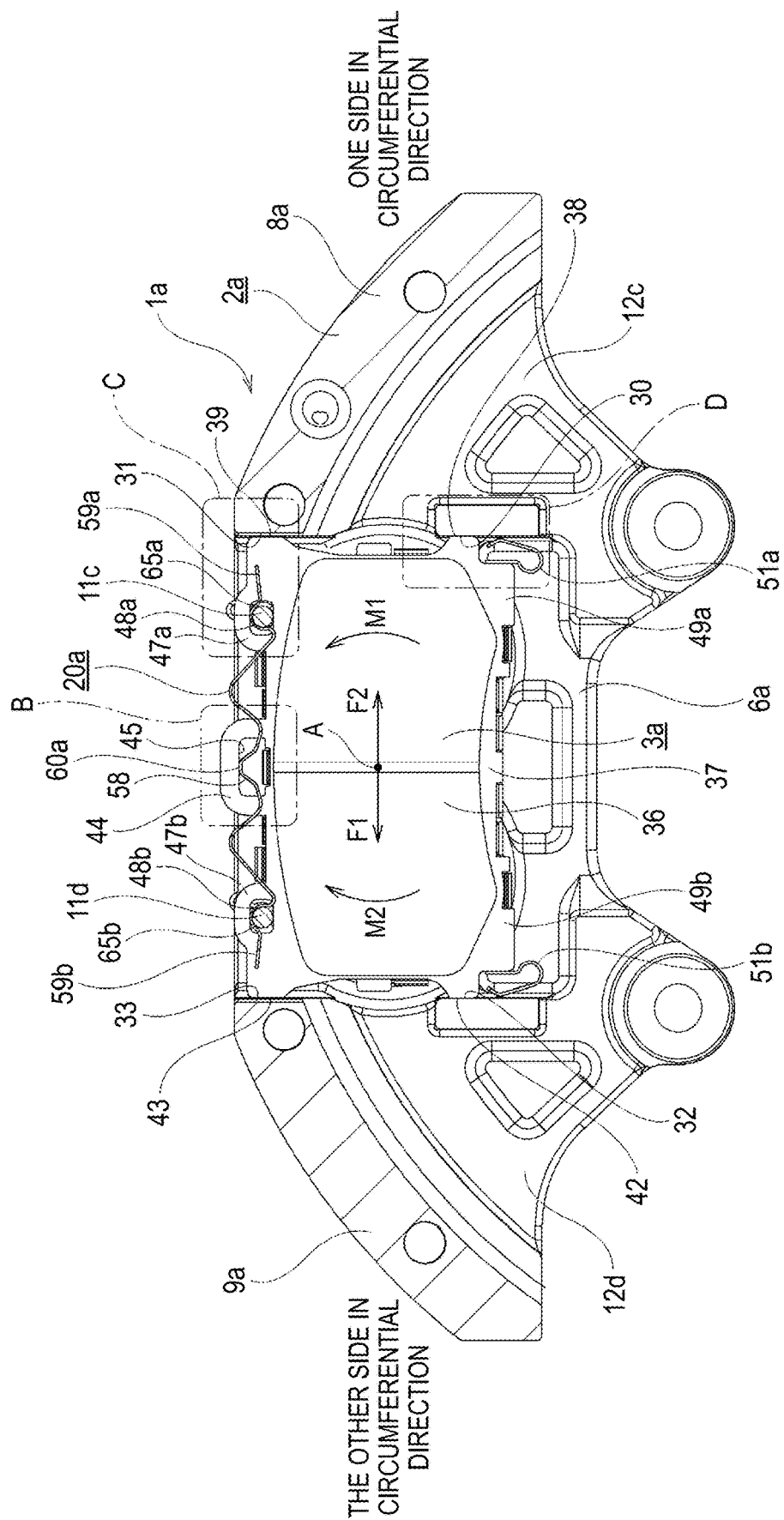
FIG. 5 is a cross-sectional view taken along a line A-A in FIG. 2.

As shown in FIG. 5, a pair of overhanging wall portions 12c, 12d overhanging in the axial direction so as to approach the rotor 5 are respectively provided on both side portions of an axially inner side surface of the inner body 6a in the circumferential direction and on both side portions of an axially inner side surface of the outer body 7 in the circumferential direction.

A first torque receiving surface 30 having a flat surface shape is provided on a side surface of the overhanging wall portion 12c disposed on the one side in the circumferential direction, at a radially inner side portion on the other side in the circumferential direction. A second torque receiving surface 32 having a flat surface shape is provided on a side surface of the overhanging wall portion 12d disposed on the other side in the circumferential direction, at a radially inner side portion on the one side in the circumferential direction.

Each of the first coupling portion 8a and the second coupling portion 9a is disposed on the radially outer side of the rotor 5, and couples end portions of the inner body 6a and the outer body 7 in the circumferential direction to each other in the axial direction. The first coupling portion 8a couples the end portions of the inner body 6a and the outer body 7a on the one side in the circumferential direction to each other in the axial direction, and the second coupling portion 9a connects the end portions of the inner body 6a and the outer body 7a on the other side in the circumferential direction to each other in the axial direction. The first coupling portion 8a and the second coupling portion 9a are each curved in an arc shape along an outer peripheral edge of the rotor 5, and cover the rotor 5 from outside in the radial direction via a predetermined gap.

A first moment bearing surface 31 having a flat surface shape is provided on a side surface of the first coupling portion 8a on the other side in the circumferential direction, the side surface of the first coupling portion 8a being located radially outward than the first torque receiving surface 30. A second moment bearing surface 33 having a flat surface shape is provided on a side surface of the second coupling portion 9a on the one side in the circumferential direction, the side surface of the second coupling portion 9a being located radially outward than the second torque receiving surface 32.

Each of the pair of pins 11c, 11d has a cylindrical shape. Each of the pair of pins 11c, 11d is disposed parallel to a central axis of the rotor 5 on the radially outer side of the rotor 5. End portions of each of the pair of pins 11c, 11d in the axial direction are supported by radially outer side portions of the inner body 6a and the outer body 7a. Specifically, the end portions of each of the pair of pins 11c, 11d in the axial direction are respectively inserted into pin support holes 34 formed in the inner body 6a and the outer body 7a (see FIG. 1). Thereby, the pair of pins 11c, 11d are bridged between the inner body 6a and the outer body 7a.

Figure 4:
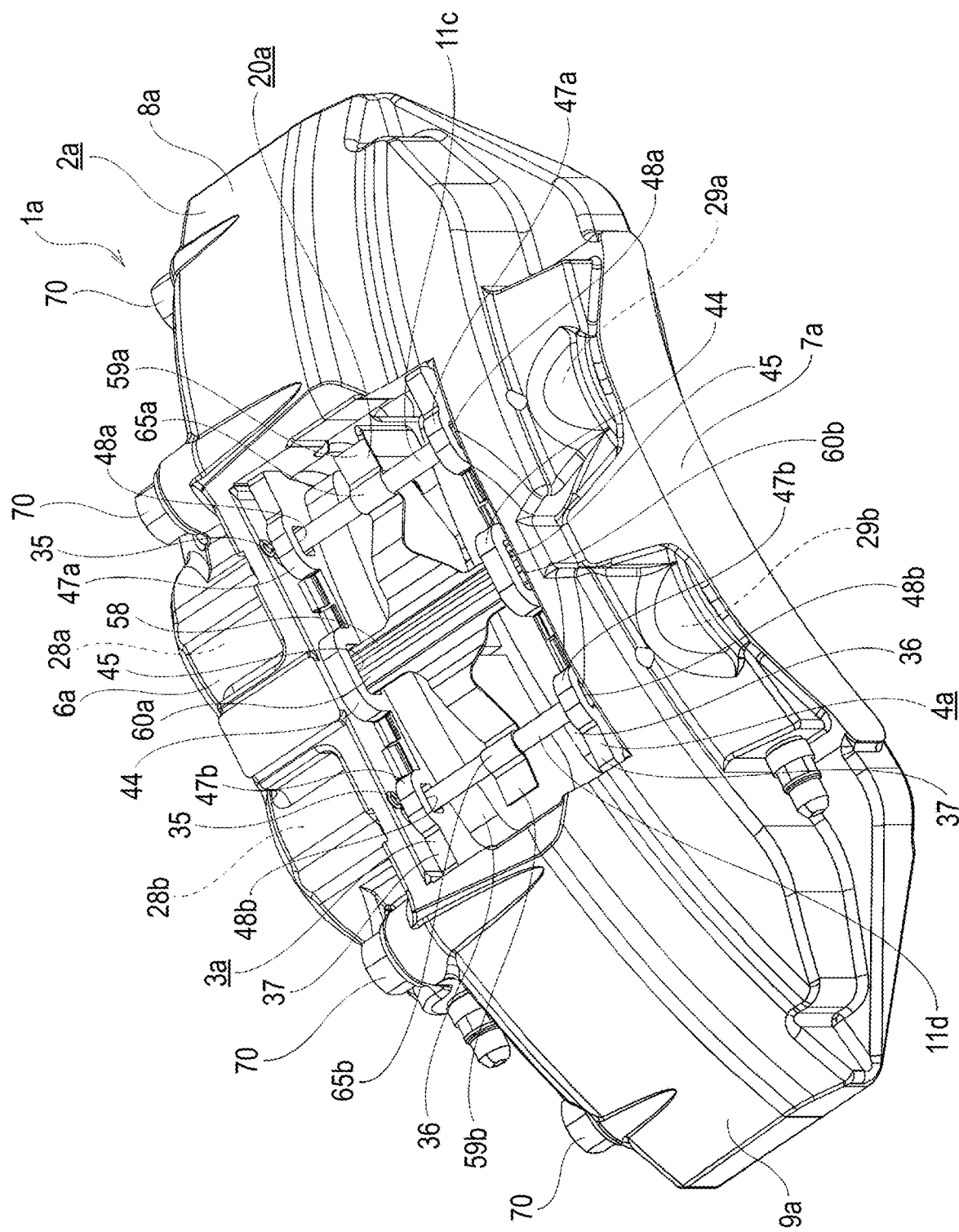
FIG. 4 is a perspective view of the disc brake device according to the first embodiment as viewed from a front side, a radially outer side and a circumferentially other side.

As shown in FIGS. 2 and 4, a stopper fitting 35 is locked to a portion of an intermediate portion of each of the pins 11c, 11d in the axial direction, the portion being located between the inner pad 3a and the inner body 6a. Thereby, the end portions of the pins 11c, 11d in the axial direction are prevented from coming out of the pin support holes 34 in the axial direction. An outer diameter of each of the pair of pins 11c, 11d is slightly smaller than an inner diameter of the pin support hole 34.

[Inner Pad and Outer Pad]

The inner pad 3a and the outer pad 4a are disposed on both sides of the rotor 5 in the axial direction. Specifically, the inner pad 3a is disposed between the rotor 5 and the inner body 6a, and the outer pad 4a is disposed between the rotor 5 and the outer body 7a. Each of the inner pad 3a and the outer pad 4a includes a lining (a friction material) 36 and a metal back plate (a pressure plate) 37 supporting a back surface of the lining 36. In the present embodiment, the inner pad 3a and the outer pad 4a are the same components having the same shape and the same size. Therefore, the following description of details of each part will be focused only on the inner pad 3a.

Figure 9:
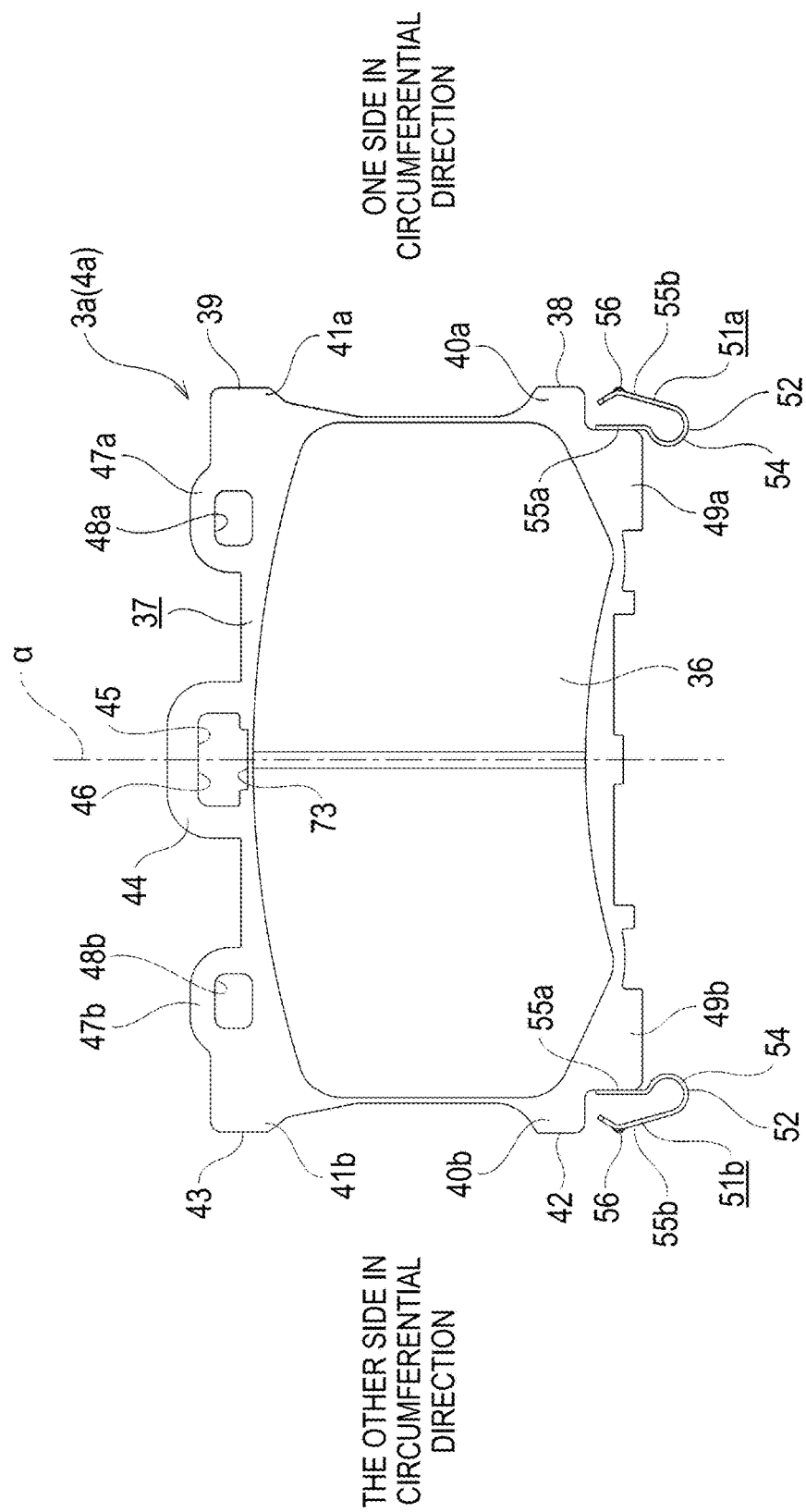
FIG. 9 is a front view showing an inner pad (an outer pad) taken out from the disc brake device according to the first embodiment.
Figure 10:
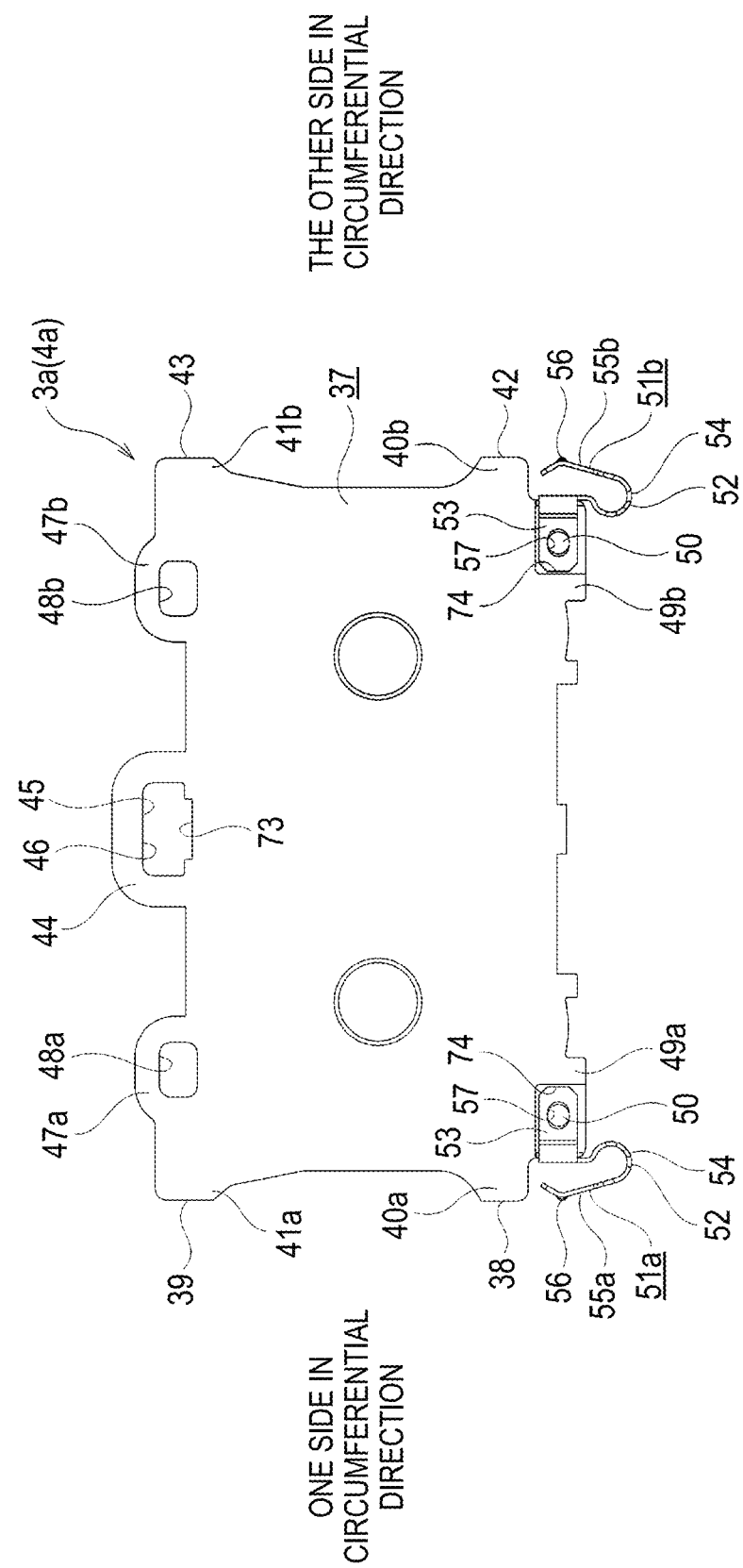
FIG. 10 is a rear view showing the inner pad (the outer pad) taken out from the disc brake device according to the first embodiment.

As shown in FIG. 9, each of the lining 36 and the back plate 37 constituting the inner pad 3a has a line-symmetric shape with respect to a symmetry axis a passing through a central portion in the circumferential direction. Therefore, each of the lining 36 and the back plate 37 has the same shape at one side portion in the circumferential direction and the other side portion in the circumferential direction.

On a side surface of the back plate 37 on the one side in the circumferential direction, a first torque transmission surface 38 having a flat surface shape is provided on a radially inner side portion, and a first moment transmission surface 39 having a flat surface shape is provided on a radially outer side portion. The first torque transmission surface 38 is provided on a tip end surface of a radially inner side protruding portion 40a. The radially inner side protruding portion 40a is located at a radially inner side portion of the one side portion of the back plate 37 in the circumferential direction, and protrudes to the one side in the circumferential direction from the lining 36. The first moment transmission surface 39 is provided on a tip end surface of a radially outer side protruding portion 41a. The radially outer side protruding portion 41a is located at a radially outer side end portion of the one side portion of the back plate 37 in the circumferential direction, and protrudes to the one side in the circumferential direction from the lining 36.

On a side surface of the back plate 37 on the other side in the circumferential direction, a second torque transmission surface 42 having a flat surface shape is provided on a radially inner side portion, and a second moment transmission surface 43 having a flat surface shape is provided on a radially outer side portion. The second torque transmission surface 42 is provided on a tip end surface of a radially inner side protruding portion 40b. The radially inner side protruding portion 40b is located at a radially inner side portion of the other side portion of the back plate 37 in the circumferential direction, and protrudes to the other side in the circumferential direction from the lining 36. The second moment transmission surface 43 is provided on a tip end surface of a radially outer side protruding portion 41b. The radially outer side protruding portion 41b is located at a radially outer side end portion of the other side portion of the back plate 37 in the circumferential direction, and protrudes to the other side in the circumferential direction from the lining 36.

The back plate 37 includes a central protrusion 44 protruding radially outward from portions adjacent to both sides in the circumferential direction, at a central portion of a radially outer side portion in the circumferential direction. The central protrusion 44 has a substantially rectangular shape. A clip insertion portion 45 penetrating in the axial direction is provided at a substantially central portion of the central protrusion 44 located at the central portion of the radially outer side portion of the back plate 37 in the circumferential direction.

The clip insertion portion 45 is a through hole that opens only on both sides of the central protrusion 44 in the axial direction, and has a substantially rectangular shape. The clip insertion portion 45 has a circumferential width dimension larger than a radial width dimension. A pressed surface 46 having a flat surface shape is provided on a radially outer side portion of an inner peripheral surface of the clip insertion portion 45. A locking recess 73 for locking a claw piece 72 of a shim plate 71 disposed on a back side of the back plate 37 (see FIG. 6) is provided in a radially inner side portion of the inner peripheral surface of the clip insertion portion 45.

The back plate 37 includes a pair of shoulder portions 47a, 47b protruding radially outward on both side portions of the radially outer side portion in the circumferential direction. The shoulder portion 47a on the one side in the circumferential direction is connected to the radially outer side protruding portion 41a on the one side in the circumferential direction, and the shoulder portion 47b on the other side in the circumferential direction is connected to the radially outer side protruding portion 41b on the other side in the circumferential direction. In the radially outer side portion of the back plate 37, the shoulder portions 47a, 47b located on both sides in the circumferential direction, with the clip insertion portion 45 located therebetween, have pin insertion portions 48a, 48b penetrating in the axial direction, respectively. Each of the pair of pin insertion portions 48a, 48b is a through hole that opens only on both sides of each of the shoulder portions 47a, 47b in the axial direction, and has a substantially rectangular shape. Each of the pair of pin insertion portions 48a, 48b has a circumferential width dimension larger than a radial width dimension. The radial width dimension and the circumferential width dimension of each of the pair of pin insertion portions 48a, 48b are larger than the outer diameter of each of the pins 11c, 11d.

Figure 12A:
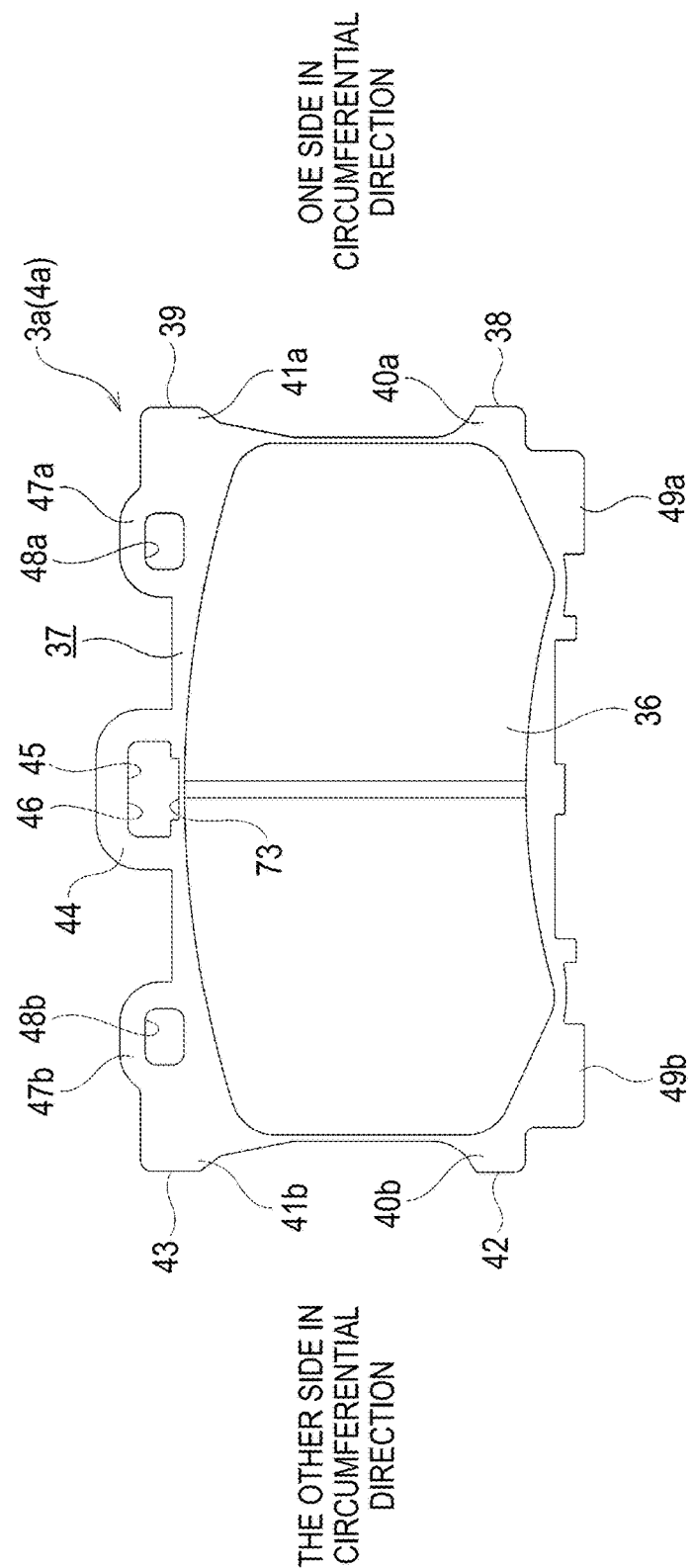
FIG. 12A is a front view showing the inner pad (the outer pad) before a circumferential clip is fixed.
Figure 12B:
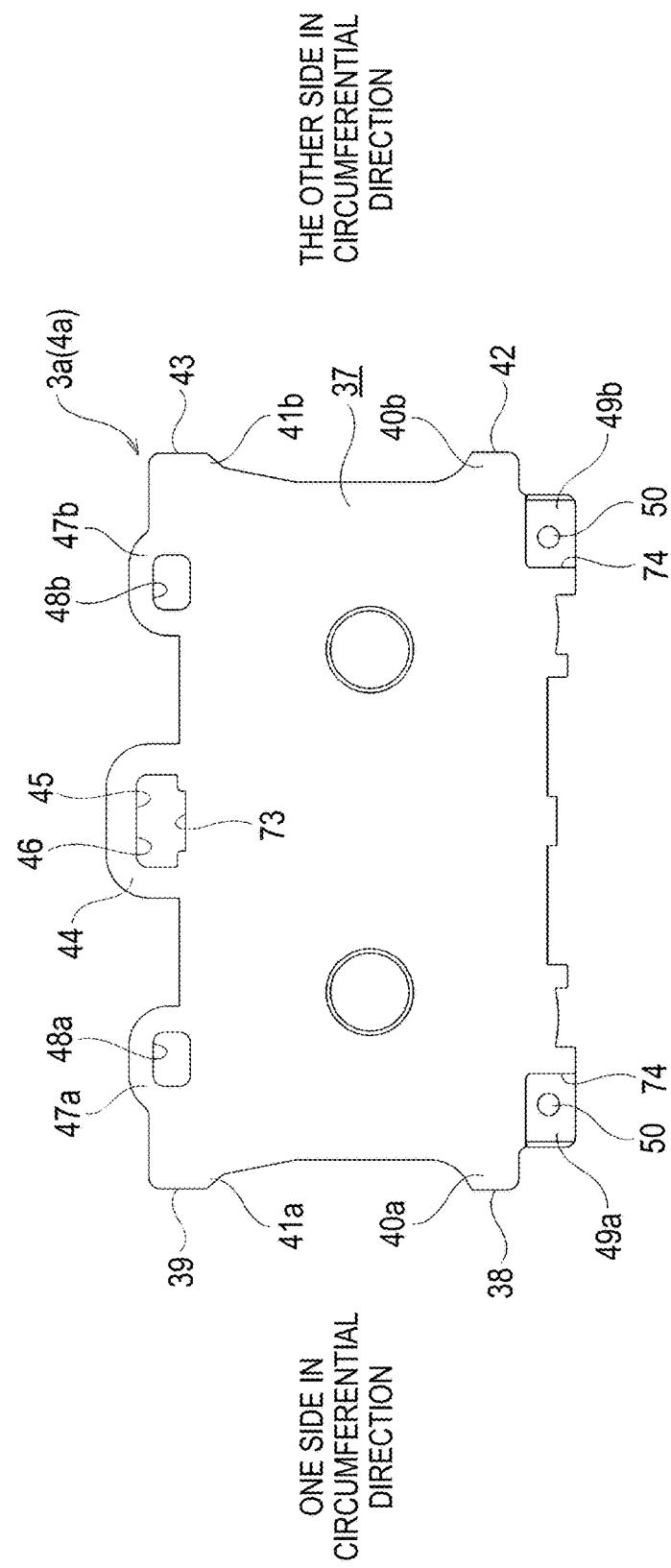
FIG. 12B is a rear view showing the inner pad (the outer pad) before a circumferential clip is fixed.

The back plate 37 includes a pair of leg portions 49a, 49b protruding radially inward on both side portions of a radially inner side portion in the circumferential direction. The leg portion 49a on the one side in the circumferential direction is connected to the radially inner side protruding portion 40a on the one side in the circumferential direction, and the leg portion 49b on the other side in the circumferential direction is connected to the radially inner side protruding portion 40b on the other side in the circumferential direction. A side surface, of the leg portion 49a on the one side in the circumferential direction, on the one side in the circumferential direction has a flat surface shape, and is located on the other side in the circumferential direction with respect to the first torque transmission surface 38 provided on the tip end surface of the radially inner side protruding portion 40a. A side surface, of the leg portion 49b on the other side in the circumferential direction, on the other side in the circumferential direction has a flat surface shape, and is located on the one side in the circumferential direction with respect to the second torque transmission surface 42 provided on the tip end surface of the radially inner side protruding portion 40b. As shown in FIG. 12B, a positioning recess 74 having a substantially rectangular shape recessed in the axial direction is provided on a back surface of each of the pair of leg portions 49a, 49b. A convex portion (a dowel) 50 protruding in the axial direction is provided at a substantially central portion of the positioning recess 74.

Each of the inner pad 3a and the outer pad 4a further includes a pair of circumferential clips 51a, 51b. The pair of circumferential clips 51a, 51b are fixed to both side portions of the back plate 37 in the circumferential direction. Specifically, the circumferential clips 51a, 51b are fixed to the leg portions 49a, 49b, respectively.

Each of the circumferential clips 51a, 51b is made of a metal plate and includes a main body portion 52 bent in a substantially U shape and an attachment plate portion 53 having a substantially flat plate shape.

The main body portion 52 includes a bent portion 54 having a partially cylindrical shape and a pair of pressing arm portions 55a, 55b connected to the bent portion 54. In the pair of pressing arm portions 55a, 55b, one pressing arm portion 55a is formed in a flat plate shape, whereas the other pressing arm portion 55b has a contact portion 56 bulging in a partially spherical shape at a portion close to a tip end. The attachment plate portion 53 extends in a substantially right angle direction from a tip end portion of the one pressing arm portion 55a.

The circumferential clip 51a is fixed to the leg portion 49a in a state where the main body portion 52 is disposed in a space located on the one side in the circumferential direction of the leg portion 49a on the one side in the circumferential direction and on the radially inner side of the radially inner side protruding portion 40a. Specifically, the attachment plate portion 53 is fixed to the back surface of the leg portion 49a by disposing the attachment plate portion 53 in the positioning recess 74 provided on the back surface of the leg portion 49a, inserting the convex portion 50 into a through hole 57 provided in the attachment plate portion 53, and caulking and deforming a tip end portion of the convex portion 50.

The circumferential clip 51b is fixed to the leg portion 49b in a state where the main body portion 52 is disposed in a space located on the other side in the circumferential direction of the leg portion 49b on the other side in the circumferential direction and on the radially inner side of the radially inner side protruding portion 40b. Specifically, the attachment plate portion 53 is fixed to the back surface of the leg portion 49b by disposing the attachment plate portion 53 in the positioning recess 74 provided on the back surface of the leg portion 49b, inserting the convex portion 50 into the through hole 57 provided in the attachment plate portion 53, and caulking and deforming the tip end portion of the convex portion 50.

When the circumferential clips 51a, 51b are fixed to the back plate 37, the respective bent portions 54 are located radially inward than a radially inner end edge of the back plate 37, and the respective contact portions 56 are located slightly radially inward than a radially inner end edge of the lining 36.

[Pad Support Structure]

The inner pad 3a and the outer pad 4a are supported by the caliper 2a so as to be movable in the axial direction by using the pair of pins 11c, 11d. Therefore, in the pair of pin insertion portions 48a, 48b provided in the back plate 37, the pin 11c disposed on the one side in the circumferential direction is inserted in the axial direction into the pin insertion portion 48a disposed on the one side in the circumferential direction, and the pin 11d disposed on the other side in the circumferential direction is inserted in the axial direction into the pin insertion portion 48b disposed on the other side in the circumferential direction.

As shown in FIG. 5, when the inner pad 3a and the outer pad 4a are suspended from the caliper 2a, the first torque transmission surface 38 and the first moment transmission surface 39 provided on the side surface of the back plate 37 on the one side in the circumferential direction respectively face, in the circumferential direction, the first torque receiving surface 30 provided on the overhanging wall portion 12c on the one side in the circumferential direction and the first moment bearing surface 31 provided on the first coupling portion 8a. The second torque transmission surface 42 and the second moment transmission surface 43 provided on the side surface of the back plate 37 on the other side in the circumferential direction respectively face, in the circumferential direction, the second torque receiving surface 32 provided on the overhanging wall portion 12d on the other side in the circumferential direction and the second moment bearing surface 33 provided on the second coupling portion 9a.

When the inner pad 3a and the outer pad 4a are suspended from the caliper 2a, each of the pair of circumferential clips 51a, 51b is elastically deformed between each of the inner pad 3a and the outer pad 4a and the caliper 2a.

Figure 8:
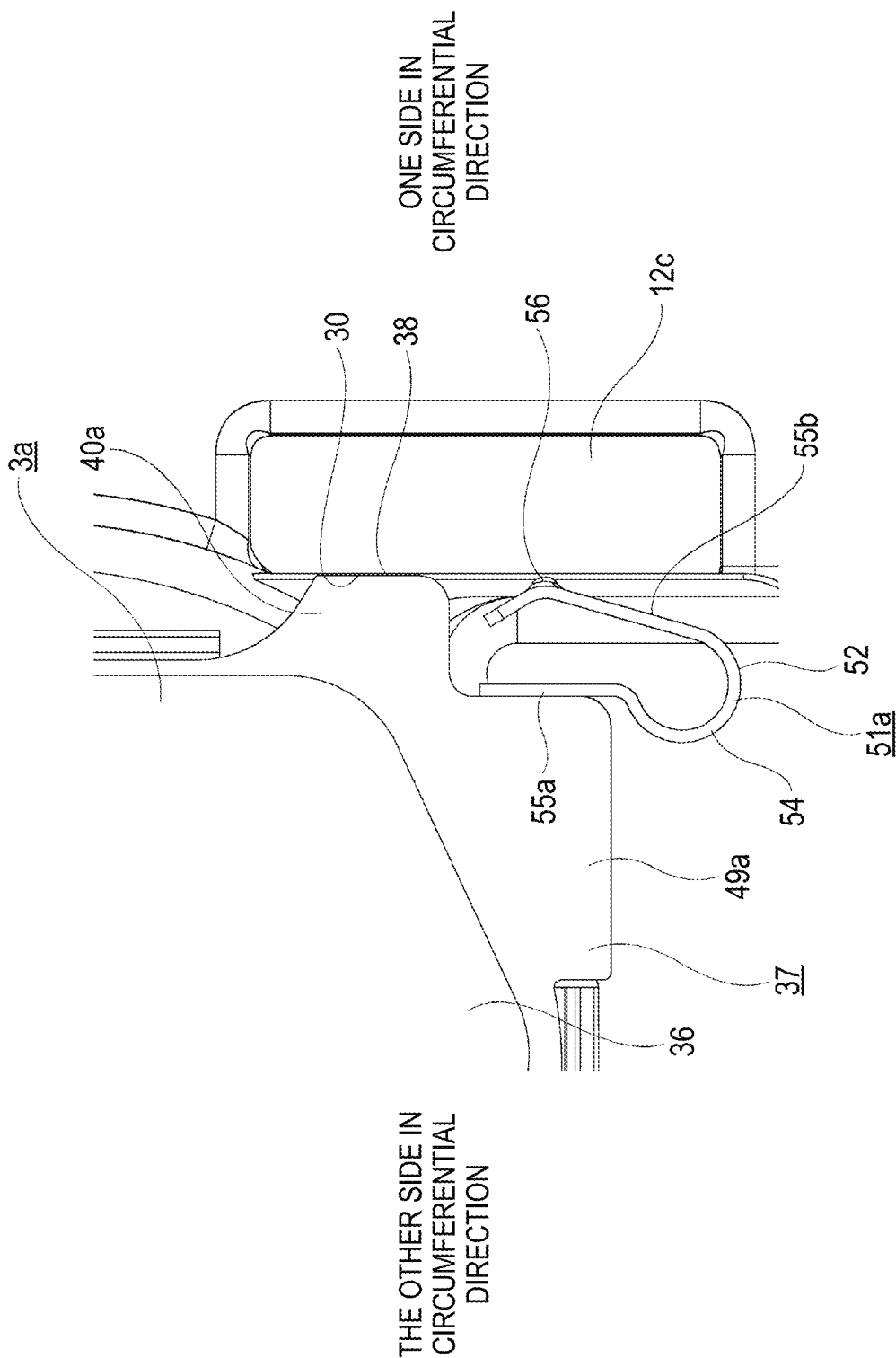
FIG. 8 is an enlarged view of a portion D in FIG. 5.

As shown in FIG. 8, the circumferential clip 51a on the one side in the circumferential direction is elastically deformed between the side surface, of the leg portion 49a provided in the back plate 37, on the one side in the circumferential direction, and the side surface (the first torque receiving surface 30), of the overhanging wall portion 12c provided in the caliper 2a, on the other side in the circumferential direction. The circumferential clip 51a presses each of the inner pad 3a and the outer pad 4a and the caliper 2a in directions opposite to each other in the circumferential direction. Specifically, the circumferential clip 51a presses radially inner side portions of the side surface of the leg portion 49a in the circumferential direction and the side surface of the overhanging wall portion 12c on the other side in the circumferential direction, the portions being slightly radially inward than the radially inner end edge of the lining 36, where the contact portion 56 is located.

The circumferential clip 51b on the other side in the circumferential direction is elastically deformed between the side surface, of the leg portion 49b provided in the back plate 37, on the other side in the circumferential direction, and the side surface (the second torque receiving surface 32), of the overhanging wall portion 12d provided in the caliper 2a, on the one side in the circumferential direction. Then, each of the inner pad 3a and the outer pad 4a and the caliper 2a are pressed in directions opposite to each other in the circumferential direction. Specifically, the circumferential clip 51b presses radially inner side portions of the side surface of the leg portion 49b in the circumferential direction and the side surface of the overhanging wall portion 12d on the one side in the circumferential direction, the portions being slightly radially inward than the radially inner end edge of the lining 36, where the contact portion 56 is located.

The circumferential clip 51a disposed on the one side in the circumferential direction presses a radially inner side portion of each of the inner pad 3a and the outer pad 4a toward the other side in the circumferential direction. In contrast, the circumferential clip 51b disposed on the other side in the circumferential direction presses the radially inner side portion of each of the inner pad 3a and the outer pad 4a toward the one side in the circumferential direction. Since pressing forces of the pair of circumferential clips 51a, 51b are equal to each other, each of the inner pad 3a and the outer pad 4a is elastically held (centered) at a neutral position in the circumferential direction.

[Pad Clip]

The disc brake device 1a according to the present embodiment further includes the pad clip 20a in order to prevent occurrence of a brake noise during light braking in which a brake fluid has a low hydraulic pressure. The pad clip 20a is made of a metal plate having elasticity and corrosion resistance such as a stainless steel plate, and has a substantially cross shape as viewed in the radial direction (in a plan view).

The pad clip 20a is integrally formed as a whole, and includes a substrate portion 58 extending in the axial direction, and a pair of circumferential arm portions 59a, 59b extending in directions away from each other in the circumferential direction from an intermediate portion of the substrate portion 58 in the axial direction.

Figure 6:
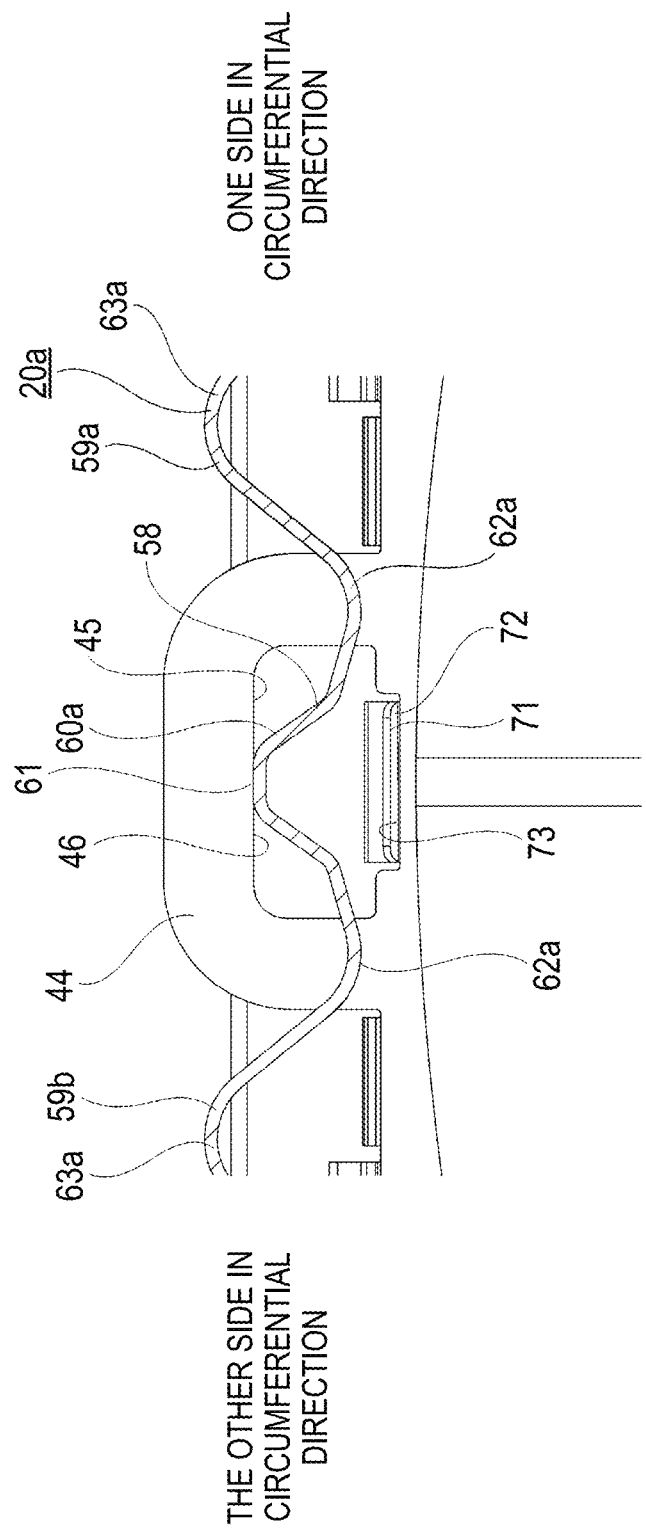
FIG. 6 is an enlarged view of a portion B in FIG. 5.

As shown in FIG. 2, in a mounted state of the pad clip 20a, the substrate portion 58 is disposed between the pair of pins 11c, 11d in the circumferential direction and on the radially outer side of the rotor 5. The substrate portion 58 has a chevron-shaped cross section that is convex on a radially outer side. The cross-sectional shape of the substrate portion 58 is constant in the axial direction. The substrate portion 58 includes a pad pressing portion 60a that is inserted into the clip insertion portion 45 of the inner pad 3a in the axial direction, at an end portion on one side in the axial direction, and includes a pad pressing portion 60b that is inserted into the clip insertion portion 45 of the outer pad 4a in the axial direction, at an end portion on the other side in the axial direction. That is, the substrate portion 58 includes the pair of pad pressing portions 60a, 60b disposed at both end portions in the axial direction. As shown in FIG. 6, each of the pair of pad pressing portions 60a, 60b has a pressing surface 61 having a flat surface shape, which is in surface contact with the pressed surface 46 constituting the inner peripheral surface of the clip insertion portion 45, on a radially outer side end surface.

As shown in FIG. 2, in the mounted state of the pad clip 20a, each of the pair of circumferential arm portions 59a, 59b is disposed between the inner pad 3a and the outer pad 4a and on the radially outer side of the rotor 5. As shown in FIG. 13, each of the pair of circumferential arm portions 59a, 59b has a corrugated shape undulating in the radial direction (a plate thickness direction). The pair of circumferential arm portions 59a, 59b respectively include first curved portions 62a, 62b, second curved portions 63a, 63b, third curved portions 64a, 64b, pin pressing portions 65a, 65b, and tip end plate portions 66a, 66b in this order from the substrate portion 58.

Each of the first curved portions 62a, 62b is located at a base end portion of each of the circumferential arm portions 59a, 59b, and is connected to an intermediate portion of the substrate portion 58 in the axial direction. The first curved portions 62a, 62b are curved so as to be convex on a radially inner side. Each of the first curved portions 62a, 62b is a tapered portion whose axial width decreases toward a tip end side in the circumferential direction.

Each of the second curved portions 63a, 63b is located at an intermediate portion of each of the circumferential arm portions 59a, 59b. The second curved portions 63a, 63b are curved so as to be convex on the radially outer side. In a free state of the pad clip 20a, a radially outer side end portion of each of the second curved portions 63a, 63b is located radially outward than the pressing surface 61 of each of the pad pressing portions 60a, 60b.

Each of the third curved portions 64a, 64b is located at the intermediate portion of each of the circumferential arm portions 59a, 59b. The third curved portions 64a, 64b are curved so as to be convex on the radially inner side. A radially inner side end portion of each of the third curved portions 64a, 64b is located on the radially innermost side of the pad clip 20a. In the free state of the pad clip 20a, a circumferential interval H64 between side surfaces of the pair of third curved portions 64a, 64b on sides far from each other in the circumferential direction (see FIG. 13) is slightly larger than a circumferential interval H11 between end portions of the pair of pins 11c, 11d on sides close to each other in the circumferential direction (see FIG. 7).

Each of the pin pressing portions 65a, 65b is located at a portion near a tip end portion of each of the circumferential arm portions 59a, 59b. Each of the pin pressing portions 65a, 65b has a semi-cylindrical shape that is curved so as to be convex on the radially outer side. Each of the pin pressing portions 65a, 65b has a radius of curvature slightly larger than half the outer diameter of each of the pins 11c, 11d. A radially outer side end portion of each of the pin pressing portions 65a, 65b is located in the radial direction between a radially inner side end portion of each of the first curved portions 62a, 62b and a radially outer side end portion of each of the second curved portions 63a, 63b.

The tip end plate portions 66a, 66b are located at the tip end portions of the circumferential arm portions 59a, 59b, respectively. Each of the tip end plate portions 66a, 66b is formed in a flat plate shape.

In the mounted state, the pad clip 20a is elastically deformed between the inner pad 3a and the outer pad 4a, and the pair of pins 11c, 11d. Specifically, in the pad clip 20a, in the mounted state, the pair of pad pressing portions 60a, 60b provided at end portions of the substrate portion 58 on both sides in the axial direction are respectively inserted in the axial direction into the clip insertion portions 45 provided in the inner pad 3a and the outer pad 4a, and the pair of pin pressing portions 65a, 65b are respectively locked to the pair of pins 11c, 11 d from the radially outer side. In this state, the pair of circumferential arm portions 59a, 59b are bent and deformed in the radial direction.

Figure 7:
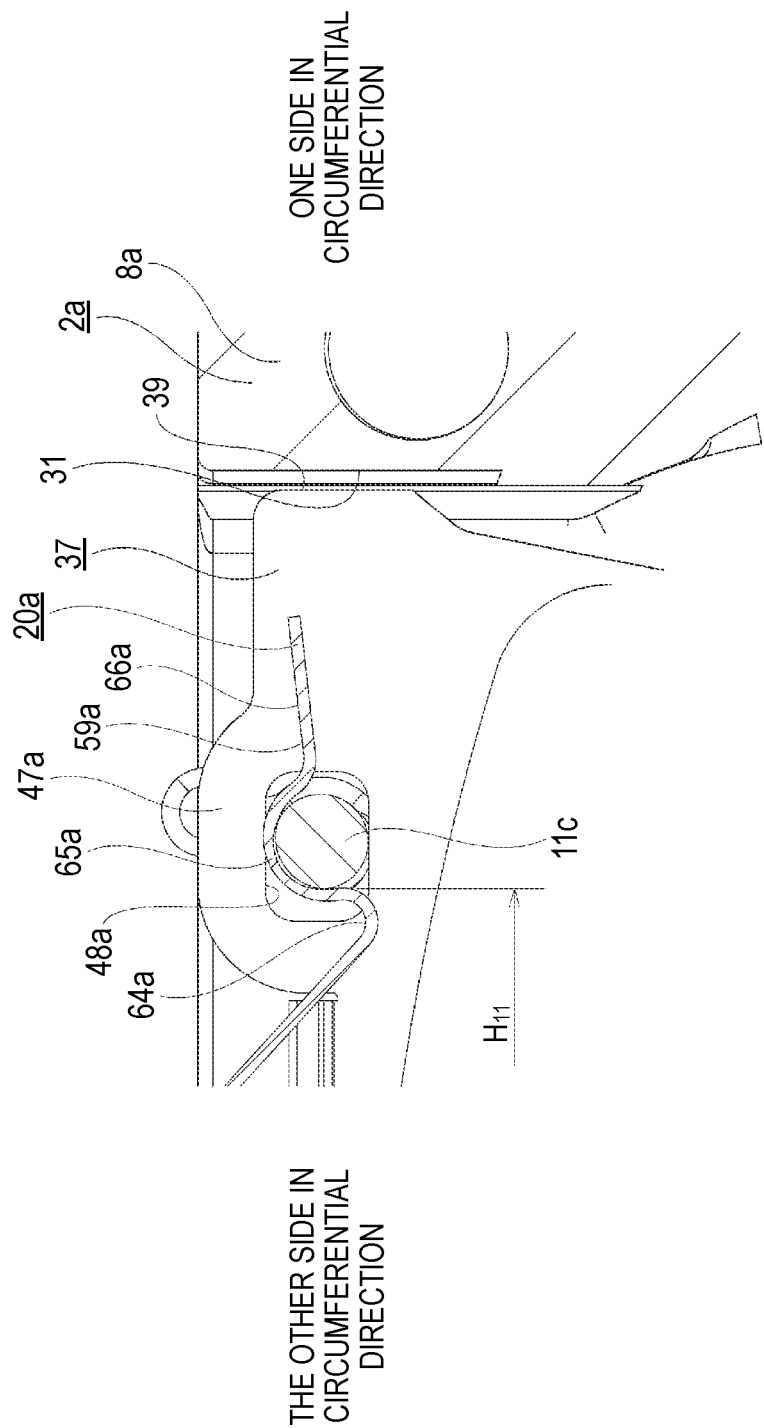
FIG. 7 is an enlarged view of a portion C in FIG. 5.

Therefore, the pad clip 20a presses the inner pad 3a and the outer pad 4a radially outward by the pair of pad pressing portions 60a, 60b, and presses the pair of pins 11c, 11 d radially inward by the pair of pin pressing portions 65a, 65b. That is, the pad clip 20a applies pressing forces radially outward to the inner pad 3a and the outer pad 4a by using the pair of pins 11c, 11d as anchors (supporting reaction forces by the pins 11c, 11d). Thereby, as shown in FIG. 7, a radially inner side portion of an inner peripheral surface of each of the pair of pin insertion portions 48a, 48b is pressed against a radially inner side end portion of each of the pair of pins 11c, 11d. Therefore, a gap is formed between a radially outer side portion of the inner peripheral surface of each of the pair of pin insertion portions 48a, 48b and a radially outer side end portion of each of the pair of pins 11c, 11d.

As shown in FIG. 6, the pressing surface 61 provided in each of the pair of pad pressing portions 60a, 60b is in surface contact with the pressed surface 46 of the clip insertion portion 45 provided in each of the inner pad 3a and the outer pad 4a.

The pair of pin pressing portions 65a, 65b further press the pair of pins 11c, 11 d in directions opposite to each other in the circumferential direction. That is, the pin pressing portion 65a on the one side in the circumferential direction presses the pin 11c on the one side in the circumferential direction toward the one side in the circumferential direction, and the pin pressing portion 65b on the other side in the circumferential direction presses the pin 11d on the other side in the circumferential direction toward the other side in the circumferential direction. Thereby, the pin 11c on the one side in the circumferential direction is pressed against one side portion in the circumferential direction of an inner circumferential surface of the pin support hole 34 on the one side in the circumferential direction, and the pin 11d on the other side in the circumferential direction is pressed against the other side portion in the circumferential direction of the inner circumferential surface of the pin support hole 34 on the other side in the circumferential direction.

Next, assembly work of the disc brake device 1a will be described with reference to FIGS. 16A, 16B, 16C.

Figure 16A:
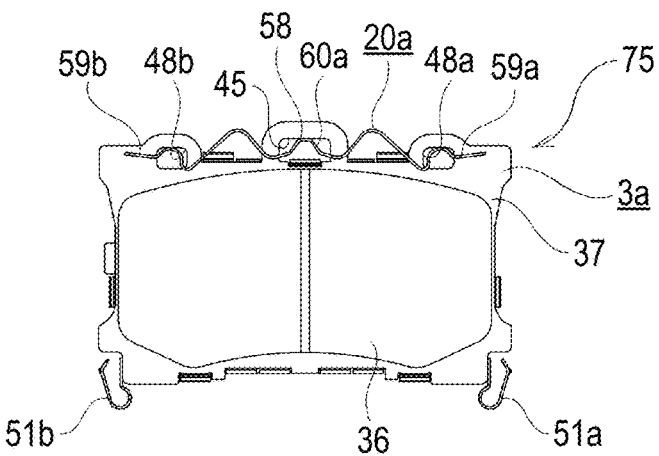
FIGS. 16A, 16B, 16C are schematic views for explaining an assembly process of the disc brake device according to the first embodiment.
Figure 16B:
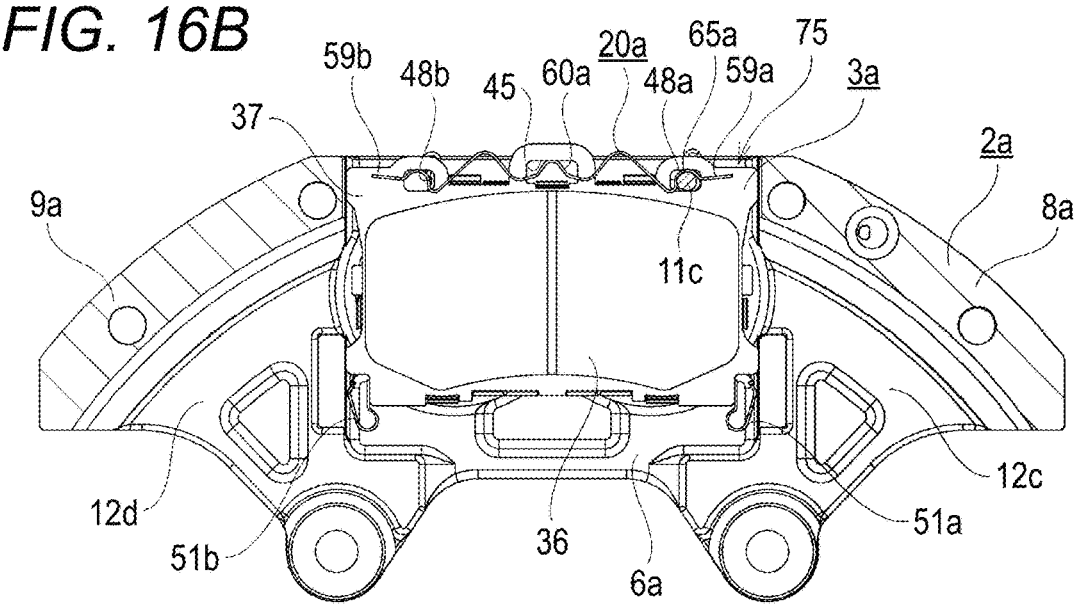
Figure 16C:
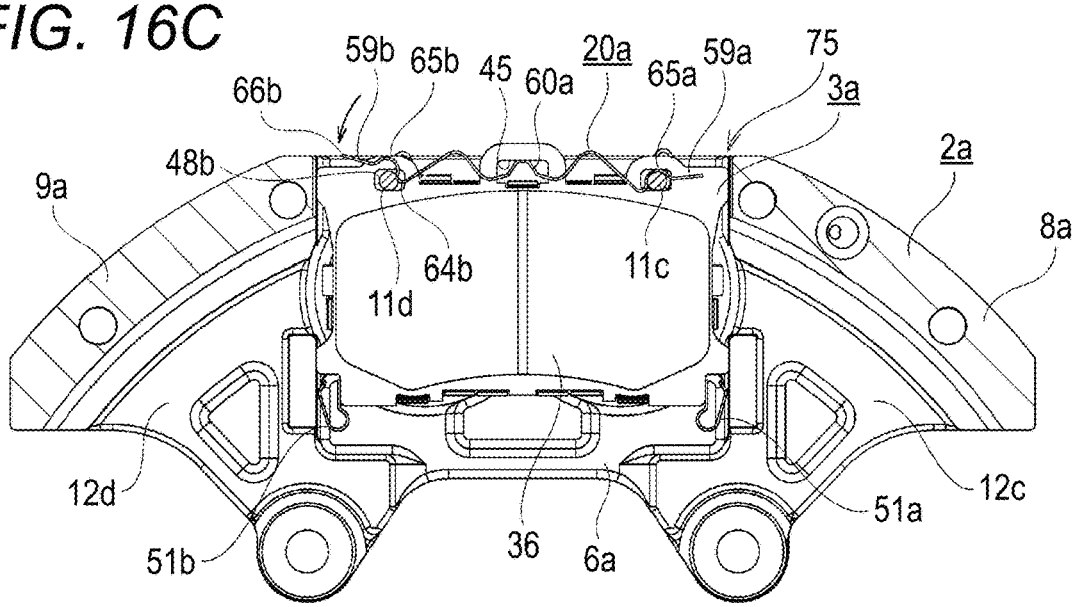

First, as shown in FIG. 16A, in a state before the inner pad 3a and the outer pad 4a are assembled into the caliper 2a, the pair of pad pressing portions 60a, 60b provided in the pad clip 20a are respectively inserted into the clip insertion portions 45 of the inner pad 3a and the outer pad 4a to obtain a pad assembly 75 including the pad clip 20a, the inner pad 3a and the outer pad 4a.

Next, the pad assembly 75 is assembled from the radially outer side into a portion between the inner body 6a and the outer body 7a constituting the caliper 2a. Then, as shown in FIG. 16B, the inner pad 3a and the outer pad 4a are suspended from the caliper 2a by one pin 11c (11d) of the pair of pins 11c, 11d. That is, the one pin 11c (11d) is inserted in the axial direction into one pin support hole 34 provided in each of the inner body 6a and the outer body 7a and one pin insertion portion 48a (48b) provided in each of the inner pad 3a and the outer pad 4a. Then, one pin pressing portion 65a (65b) provided in the pad clip 20a is locked to the one pin 11c (11d) from the radially outer side.

Next, in the pair of circumferential arm portions 59a, 59b, the other circumferential arm portion 59b (59a) provided with the other pin pressing portion 65b (65a) is pulled up (bent and deformed) radially outward while gripping the tip end plate portion 66b (66a). In this state, the other pin 11d (11c) is inserted in the axial direction into the other pin support hole 34 provided in each of the inner body 6a and the outer body 7a and the other pin insertion portion 48b (48a) provided in each of the inner pad 3a and the outer pad 4a.

Thereafter, a force gripping the other circumferential arm portion 59b (59a) is released, and the other circumferential arm portion 59b (59a) is elastically restored. Here, in the free state of the pad clip 20a, the circumferential interval H64 between the side surfaces of the pair of third curved portions 64a, 64b on the sides far from each other in the circumferential direction is set to be slightly larger than the circumferential interval H11 between the end portions of the pair of pins 11c, 11d on the sides close to each other in the circumferential direction. Therefore, as shown in FIG. 16C, a radially inner side portion of the third curved portion 64b (64a) provided on the other circumferential arm portion 59b (59a) abuts (rides on) a radially outer side portion of the other pin 11d (11c). Therefore, by further pushing the other circumferential arm portion 59b (59a) radially inward, in the other circumferential arm portion 59a (59b), the other pin pressing portion 65b (65a) is locked to the other pin 11d (11c) from the radially outer side while mainly elastically deforming the third curved portion 64b (64a) in the circumferential direction.

In the present embodiment as described above, while the other circumferential arm portion 59a (59b) is elastically deformed in the circumferential direction, the other circumferential arm portion 59b (59a) is pushed inward, so that a radially inner side surface of the other pin pressing portion 65b (65a) abuts the radially outer side portion of the other pin 11d (11c) with some force. Therefore, a worker who performs the assembly work of the disc brake device 1a can easily know that mounting work of the pad clip 20a is correctly performed by a tactile sense (a click feeling) of a finger pushing the other circumferential arm portion 59b (59a) inward and a sound (a snap sound) caused by the abutting.

In the disc brake device 1a according to the present embodiment, during braking, the brake fluid is fed from a master cylinder to the first inner cylinder 28a and the second inner cylinder 28b provided in the inner body 6a and the first outer cylinder 29a and the second outer cylinder 29b provided in the outer body 7a. Thereby, the piston (not shown) provided in each of the inner body 6a and the outer body 7a is pushed out in the axial direction, and the inner pad 3a and the outer pad 4a are pressed against both side surfaces of the rotor 5 in the axial direction. As a result, the rotor 5 is strongly sandwiched by the inner pad 3a and the outer pad 4a from both sides in the axial direction, and the vehicle is braked. The disc brake device 1a according to the present embodiment generates the following moment in each of the inner pad 3a and the outer pad 4a during braking.

[Moment Acting During Braking]

During forward braking, as shown in FIG. 5, a brake tangential force F1 directed to the other side in the circumferential direction (the left side in FIG. 5 and the rotation-out side when moving forward) acts on a point A at a friction surface center of the lining 36 of the inner pad 3a (the outer pad 4a). Thereby, the second torque transmission surface 42 disposed on the other side in the circumferential direction abuts the second torque receiving surface 32 to support the brake tangential force F1. Here, an abutting portion between the second torque transmission surface 42 and the second torque receiving surface 32 is located radially inward than the point A at the friction surface center on which the brake tangential force F1 acts. Therefore, during forward braking, a moment M1 acts on the inner pad 3a and the outer pad 4a in a direction in which one side portion in the circumferential direction, which is a rotation-in side portion when moving forward, is pushed up toward the radially outer side, and the other side portion in the circumferential direction, which is a rotation-out side portion when moving forward, is pushed down toward the radially inner side.

The moment M1 is supported by rotating the inner pad 3a (the outer pad 4a) counterclockwise and bringing the second moment transmission surface 43 disposed on the other side in the circumferential direction into abutting the second moment bearing surface 33. That is, during forward braking, a posture of each of the inner pad 3a and the outer pad 4a is restrained at two portions by the abutting portion between the second torque transmission surface 42 and the second torque receiving surface 32 and an abutting portion between the second moment transmission surface 43 and the second moment bearing surface 33. The point A at the friction surface center is a centroid of a friction surface, and is determined by a diameter, arrangement and the like of the piston.

During reverse braking, a brake tangential force F2 directed to the one side in the circumferential direction (the right side in FIG. 5 and the rotation-out side when moving reversely) acts on the point A at the friction surface center of the lining 36 of the inner pad 3a (the outer pad 4a). Thereby, the first torque transmission surface 38 disposed on the one side in the circumferential direction abuts the first torque receiving surface 30 to support the brake tangential force F2. Here, an abutting portion between the first torque transmission surface 38 and the first torque receiving surface 30 is located radially inward than the point A at the friction surface center on which the brake tangential force F2 acts. Therefore, during reverse braking, a moment M2 acts on the inner pad 3a and the outer pad 4a in a direction in which the other side portion in the circumferential direction, which is a rotation-in side portion when moving reversely, is pushed up toward the radially outer side, and one side portion in the circumferential direction, which is a rotation-out side portion when moving reversely, is pushed down toward the radially inner side.

The moment M2 is supported by rotating the inner pad 3*a* (the outer pad 4*a*) clockwise and bringing the first moment transmission surface 39 disposed on the one side in the circumferential direction into contact with the first moment bearing surface 31. That is, during reverse braking, the posture of each of the inner pad 3*a* and the outer pad 4*a* is restrained at two portions by the abutting portion between the first torque transmission surface 38 and the first torque receiving surface 30 and a contact portion between the first moment transmission surface 39 and the first moment bearing surface 31.

The inner pad 3*a* and the outer pad 4*a* according to the present embodiment as described above has a structure capable of being suspended from the caliper 2*a* by the pair of pins 11*c*, 11*d*, and can apply the pressing forces directed radially outward by the pad clip 20*a* while ensuring an area of the lining 36 and avoiding interference with other members.

That is, the back plate 37 of each of the inner pad 3*a* and the outer pad 4*a* has the clip insertion portion 45 into which the pad pressing portions 60*a*, 60*b* provided in the pad clip 20*a* can be inserted in the axial direction, at an intermediate portion of the radially outer side portion in the circumferential direction. The clip insertion portion 45 has the pressed surface 46 provided on the radially outer side portion of the inner peripheral surface. The back plate 37 of each of the inner pad 3*a* and the outer pad 4*a* has pin insertion portions 48*a*, 48*b* through which the pins 11*c*, 11*d* can be inserted in the axial direction, on both sides of the radially outer side portion in the circumferential direction with the clip insertion portion 45 located therebetween. Therefore, the inner pad 3*a* and the outer pad 4*a* can be suspended from the caliper 2*a* by using the pair of pin insertion portions 48*a*, 48*b*, and the pressing forces directed radially outward can be applied by the pad clip 20*a* by using the clip insertion portion 45.

Since the clip insertion portion 45 is provided at the intermediate portion of the radially outer side portion of the back plate 37 in the circumferential direction, which is located between the pair of pin insertion portions 48*a*, 48*b*, the radially inner side portion of the inner peripheral surface of each of the pair of pin insertion portions 48*a*, 48*b* can be effectively pressed against a radially inner side portion of each of the pair of pins 11*c*, 11*d* by using the pressing force applied to the clip insertion portion 45 from the pad clip 20*a* toward the radially outer side. Further, in the present embodiment, since the clip insertion portion 45 is provided at the central portion of the radially outer side portion of the back plate 37 in the circumferential direction, the radially inner side portion of the inner peripheral surface of each of the pair of pin insertion portions 48*a*, 48*b* can be pressed against the radially inner side portion of each of the pair of pins 11*c*, 11*d* with a force having the same magnitude. Therefore, as will be described later, the occurrence of the brake noise can be prevented not only during forward braking but also during reverse braking.

Since the clip insertion portion 45 is provided at the radially outer side portion of the back plate 37, which can protrude radially outward more than an outer peripheral edge portion of the lining 36, the area of the lining 36 can be ensured even when the clip insertion portion 45 is provided. In the present embodiment, since the clip insertion portion 45 is provided in the central protrusion 44 protruding radially outward from the portions adjacent to both sides in the circumferential direction, at the radially outer side portion of the back plate 37, a size of the clip insertion portion 45 can be sufficiently ensured without making the back plate 37 larger than necessary.

Since the clip insertion portion 45 is provided at the radially outer side portion of the back plate 37, which makes it easy to ensure a spatial margin on the radially outer side, by providing the clip insertion portion 45 and the central protrusion 44, each of the inner pad 3*a* and the outer pad 4*a* can be prevented from interfering with other members such as the caliper 2*a*.

Since portions of the inner pad 3*a* and the outer pad 4*a* to which the pressing forces directed radially outward from the pad pressing portions 60*a*, 60*b* are applied are the clip insertion portions 45 which are through holes into which the pad pressing portions 60*a*, 60*b* can be inserted in the axial direction, the pad pressing portions 60*a*, 60*b* can be prevented from interfering with other members such as the caliper 2*a*.

Since the clip insertion portion 45 is provided at the central portion of the radially outer side portion of the back plate 37 in the circumferential direction, the pair of clip insertion portions 45 provided in the inner pad 3*a* and the outer pad 4*a* can be disposed to face each other in the axial direction. Therefore, the pair of pad pressing portions 60*a*, 60*b* respectively inserted into the pair of clip insertion portions 45 can be disposed coaxially. Therefore, the shape of the pad clip 20*a* can be simplified.

Since each of the inner pad 3*a* and the outer pad 4*a* has a line-symmetric shape with respect to the target axis a passing through a central portion in the circumferential direction, the inner pad 3*a* and the outer pad 4*a* can be made to be the same component, and the components can be shared. Therefore, a manufacturing cost of the disc brake device 1*a* can be reduced.

Further, according to the disc brake device 1*a* including the inner pad 3*a* and the outer pad 4*a* of the present embodiment as described above, the occurrence of the brake noise can be prevented even during light braking in which the brake fluid has the low hydraulic pressure.

That is, the pair of pad pressing portions 60*a*, 60*b* of the pad clip 20*a* respectively apply the pressing forces directed radially outward to the inner pad 3*a* and the outer pad 4*a*, so that the radially inner side portions of the inner peripheral surfaces of the pair of pin insertion portions 48*a*, 48*b* is respectively pressed against the radially inner side end portions of the pair of pins 11*c*, 11*d*.

Therefore, for example, when light braking is performed during forward traveling, the moment M1 acting on each of the inner pad 3*a* and the outer pad 4*a* is reduced, but an acting direction of the moment M1 and acting directions of the pressing forces of the pad clip 20*a* (the pair of pad pressing portions 60*a*, 60*b*) can match at the rotation-in side portion when moving forward (the one side portion in the circumferential direction and a right side portion in FIG. 5) of the inner pad 3*a* and the outer pad 4*a*. Therefore, unlike the related-art structure described above, it is not necessary to rotate each of the inner pad 3*a* and the outer pad 4*a* counterclockwise against an elastic force of the pad clip. Therefore, each of the inner pad 3*a* and the outer pad 4*a* can be rotated counterclockwise by the small moment M1 acting on each of the inner pad 3*a* and the outer pad 4*a*, and the second moment transmission surface 43 can be easily brought into abutting the second moment bearing surface 33. As a result, at the time of light braking during forward traveling, the posture of each of the inner pad 3*a* and the outer pad 4a can be stabilized, and the occurrence of the brake noise can be prevented.

In addition, even when light braking is performed during reverse traveling, the moment M2 acting on each of the inner pad 3a and the outer pad 4a is reduced, but an acting direction of the moment M2 and the acting directions of the pressing forces of the pad clip 20a (the pair of pad pressing portions 60a, 60b) can match at the rotation-in side portion when moving reversely (the other side portion in the circumferential direction and a left side portion in FIG. 5) of the inner pad 3a and the outer pad 4a. Therefore, unlike the related-art structure described above, it is not necessary to rotate each of the inner pad 3a and the outer pad 4a clockwise against the elastic force of the pad clip. Therefore, each of the inner pad 3a and the outer pad 4a can be rotated clockwise by the small moment M2 acting on each of the inner pad 3a and the outer pad 4a, and the first moment transmission surface 39 can be easily brought into abutting the first moment bearing surface 31. As a result, even at the time of light braking during reverse traveling, the posture of each of the inner pad 3a and the outer pad 4a can be stabilized, and the occurrence of the brake noise can be prevented.

Since the pressed surface 46 provided in the clip insertion portion 45 is a flat surface and the pressing surface 61 provided in each of the pad pressing portions 60a, 60b is a flat surface, the pressing surface 61 and the pressed surfaces 46 can be brought into surface contact with each other. Therefore, a surface pressure of a contact portion between the pressing surface 61 and the pressed surface 46 can be reduced. Therefore, wear of the pressing surface 61 and the pressed surface 46 can be suppressed. During braking, the pressed surface 46 can be smoothly displaced in the axial direction with respect to the pressing surface 61.

In the disc brake device 1a according to the present embodiment, the pad clip 20a applies the pressing forces in the directions opposite to each other in the circumferential direction to the pair of pins 11c, 11d, whereby the pair of pins 11c, 11d are pressed against inner surfaces of the pin support holes 34 respectively provided in the inner body 6a and the outer body 7a. Therefore, when each of the inner pad 3a and the outer pad 4a is rotated counterclockwise during forward braking, the pin 11c on the one side in the circumferential direction can be moved radially outward along the inner surface of the pin support hole 34 disposed on the one side in the circumferential direction. In addition, when each of the inner pad 3a and the outer pad 4a is rotated clockwise during reverse braking, the pin 11d on the other side in the circumferential direction can be moved radially outward along the inner surface of the pin support hole 34 disposed on the other side in the circumferential direction. Therefore, during both forward braking and reverse braking, stability of initial contact between outer circumferential surfaces of the pins 11c, 11d and inner circumferential surfaces of the pin support holes 34 can be ensured, and occurrence of vibration in the pins 11c, 11d can be prevented.

Since the pair of circumferential arm portions 59a, 59b each have the corrugated shape including the first curved portions 62a, 62b, the second curved portions 63a, 63b, and the third curved portions 64a, 64b, the pressing forces (spring loads) by the pair of pad pressing portions 60a, 60b can be increased in comparison with a case where the pair of circumferential arm portions 59a, 59b both have a flat plate shape. Since each of the first curved portions 62a, 62b is the tapered portion whose axial width decreases as being away from the substrate portion 58, the pressing forces by the pair of pad pressing portions 60a, 60b can be also increased in this case.

In the present embodiment, each of the inner pad 3a and the outer pad 4a is pressed in the directions opposite to each other in the circumferential direction by the circumferential clips 51a, 51b provided on both side portions of each of the inner pad 3a and the outer pad 4a in the circumferential direction. Thereby, each of the inner pad 3a and the outer pad 4a can be elastically held at the neutral position in the circumferential direction, and a size of a circumferential gap between the first torque transmission surface 38 and the first torque receiving surface 30 and a size of a circumferential gap between the second torque transmission surface 42 and the second torque receiving surface 32 can be prevented from becoming unnecessarily large (can be made substantially equal to each other). Therefore, during forward braking, the second torque transmission surface 42 and the second torque receiving surface 32 can be prevented from vigorously colliding with each other to cause an abnormal noise (a click sound), and during reverse braking, the first torque transmission surface 38 and the first torque receiving surface 30 can be prevented from vigorously colliding with each other to cause an abnormal noise.

Since a radially outer side portion of each of the inner pad 3a and the outer pad 4a is suspended by the pair of pins 11c, 11d, a radially inner side portion thereof tends to be inclined toward the rotor 5 when a braking force is released. However, in the present embodiment, the circumferential clips 51a, 51b are sandwiched between the radially inner side portion of each of the inner pad 3a and the outer pad 4a and the overhanging wall portions 12c, 12d of the caliper 2a in a state of being elastically deformed. The circumferential clips 51a, 51b press portions of the side surfaces of the leg portions 49a, 49b in the circumferential direction and the side surfaces of the overhanging wall portions 12c, 12d in the circumferential direction, respectively, the portions being located slightly radially inward than the radially inner end edge of the lining 36. Therefore, when the braking force is released, an inclination angle of each of the inner pad 3a and the outer pad 4a can be sufficiently reduced. Therefore, dragging of the inner pad 3a and the outer pad 4a can be reduced.

Second Embodiment

Figure 17:
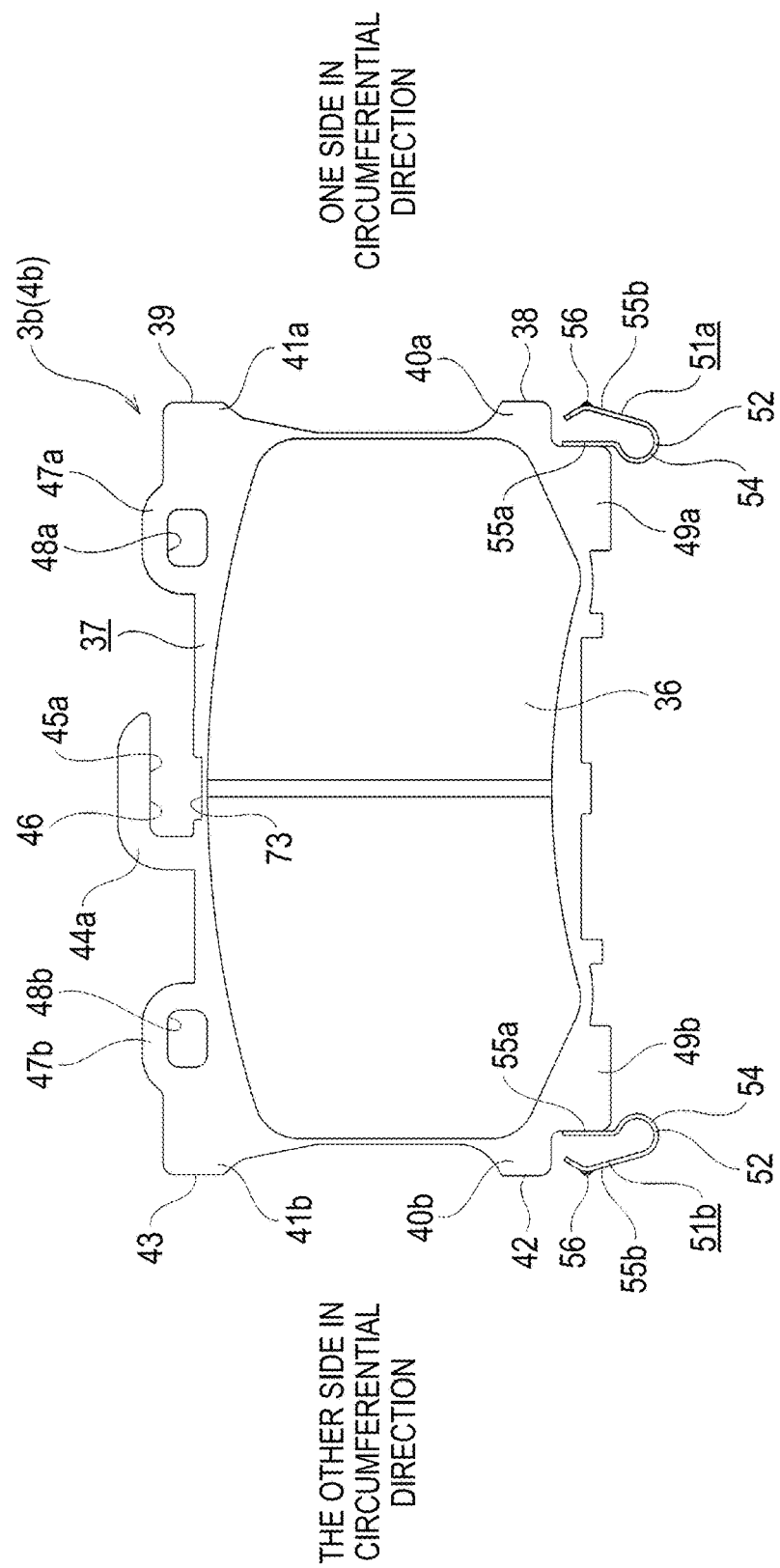
FIG. 17 is a view corresponding to FIG. 9, showing a second embodiment.
Figure 18:
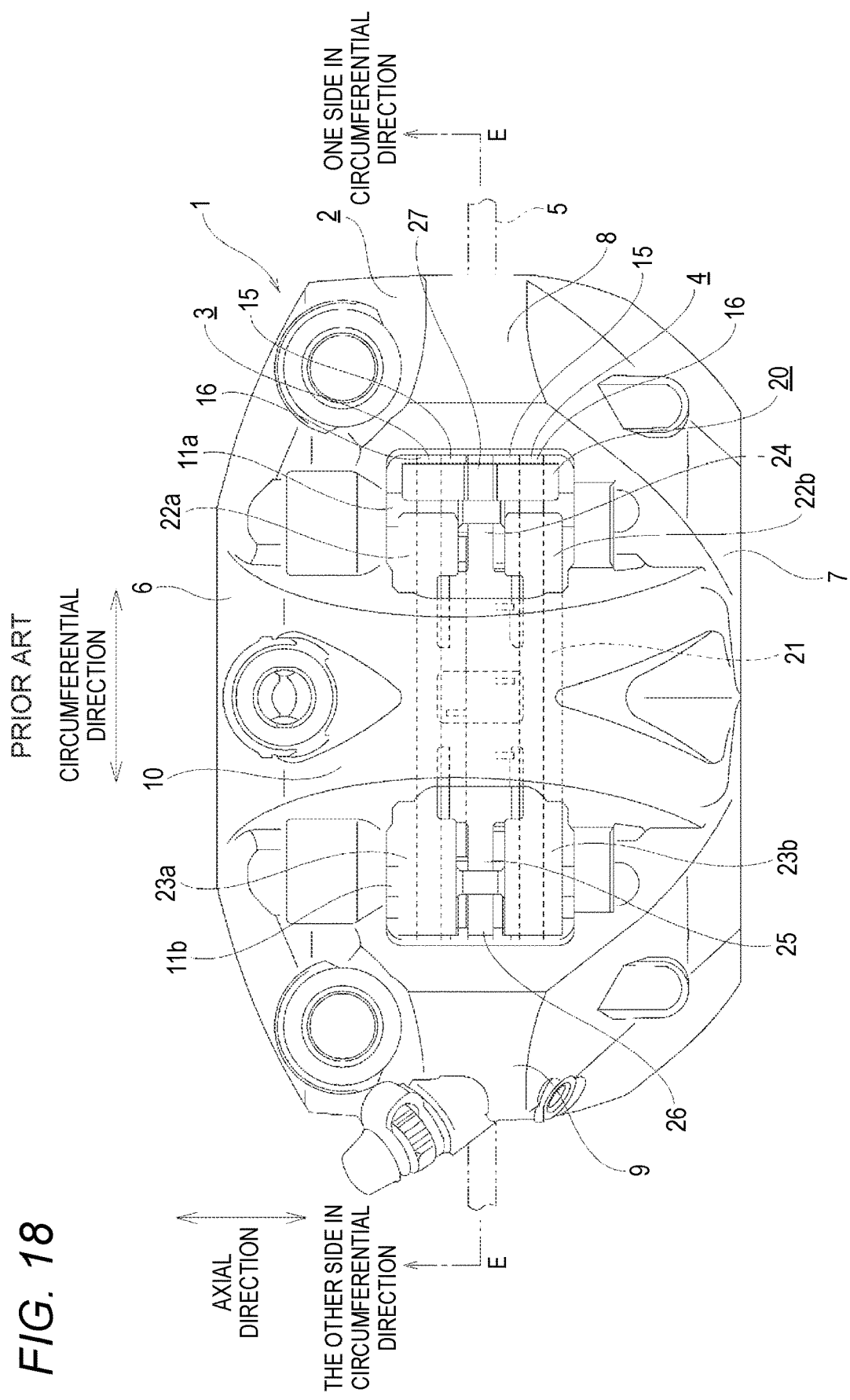
FIG. 18 is a plan view showing a disc brake device having a related-art structure.

A second embodiment will be described with reference to FIG. 17. In the present embodiment, the same components as those of the first embodiment are denoted by the same reference numerals as those of the first embodiment, and detailed description thereof will be omitted.

In the present embodiment, a clip insertion portion 45a provided in an inner pad 3b (an outer pad 4b) is not a through hole that opens only on both sides of a central protrusion 44a in the axial direction, but is a notch that also opens on the both sides of the central protrusion 44a in the axial direction and on one side of the central protrusion 44a in the circumferential direction.

In the present embodiment as described above, each of the pad pressing portions 60a, 60b provided in the pad clip 20a (see FIG. 14 and the like) can be inserted into the clip insertion portion 45a from the one side in the circumferential direction. Therefore, the pad clip 20a can be mounted later in a state where each of the inner pad 3b and the outer pad 4b is suspended from the caliper 2a (see FIG. 5 and the like) by the pair of pins 11c, 11d (see FIG. 5 and the like). Therefore, work efficiency of assembly work of the disc brake device 1a can be improved. Processing work of the clip insertion portion 45a can be facilitated, and weights of the inner pad 3b and the outer pad 4b can be reduced.

Other configurations and operational effects are the same as those of the first embodiment.

As a modification of the present embodiment, a clip insertion portion may open not only on the both sides of a protrusion (a back plate) in the axial direction but also on the other side of the protrusion in the circumferential direction or a radially outer side of the protrusion. In addition, the clip insertion portion may be a bottomed hole that does not penetrate in the axial direction.

Although the embodiments of the present invention have been described above, the present invention is not limited thereto, and can be appropriately changed without departing from the technical idea of the present invention. In addition, the structures of the embodiments can be appropriately combined and implemented as long as no contradiction occurs.

A disc brake pad according to the present invention is not limited to the opposed piston type disc brake device as described in each embodiment, and can be used by being assembled into a floating type disc brake device.

What is claimed is:

1. A disc brake pad which is supported by a pair of pins to a pad support member so that the disc brake pad is movable in an axial direction of a rotor, the disc brake pad comprising:
    a lining; and
    a back plate supporting a back surface of the lining,
    wherein the back plate includes a clip insertion portion into which a part of a pad clip is inserted in the axial direction, at an intermediate portion of a radially outer side portion in a circumferential direction of the rotor,
    wherein the back plate includes pin insertion portions into which the pins are respectively inserted in the axial direction, at both sides of the radially outer side portion in the circumferential direction with the clip insertion portion located between the pin insertion portions,
    wherein the clip insertion portion includes, on a radially outer side portion of an inner peripheral surface of the clip insertion portion, a pressed surface to which a pressing force directed outward in a radial direction of the rotor is applied from the pad clip,
    wherein a circumferential clip that is elastically deformed in the circumferential direction between the back plate and the pad support member is fixed to the back plate, and
    wherein the circumferential clip has a main body portion bent in a U-shape as viewed in the axial direction of the rotor.

2. The disc brake pad according to claim 1,
    wherein the pressed surface is a flat surface.

3. The disc brake pad according to claim 1,
    wherein the back plate includes the clip insertion portion at a central portion of the radially outer side portion in the circumferential direction.

4. The disc brake pad according to claim 3,
    wherein the back plate includes a central protrusion protruding outward the radial direction of the rotor from portions adjacent to the both sides in the circumferential direction, at the central portion of the radially outer side portion in the circumferential direction, and
    wherein the clip insertion portion is provided in the central protrusion.

5. The disc brake pad according to claim 3,
    wherein each of the lining and the back plate has a line-symmetric shape with respect to a symmetry axis passing through a central portion in the circumferential direction.

6. The disc brake pad according to claim 1,
    wherein the back plate includes a flat surface-shaped torque transmission surface that transmits a brake tangential force to the pad support member, on a radially inner side portion of a side surface on a rotation-out side, and includes a flat surface-shaped moment transmission surface that supports a moment in a direction in which a rotation-in side portion is pushed up toward a radially outer side by abutting the pad support member, on a radially outer side portion of the side surface on the rotation-out side.

7. The disc brake pad according to claim 6,
    wherein each of the torque transmission surface and the moment transmission surface is provided on a tip end surface of a protruding portion protruding in the circumferential direction.

8. The disc brake pad according to claim 1,
    wherein the clip insertion portion is a through hole that opens only on both sides of the back plate in the axial direction.

9. The disc brake pad according to claim 1,
    wherein the clip insertion portion is a notch that opens on both sides of the back plate in the axial direction and opens on a side of the back plate in a radial direction or the circumferential direction.

10. The disc brake pad according to claim 1,
    wherein the circumferential clip opens in a radially outer side of the rotor.

11. The disc brake pad according to claim 10,
    wherein the circumferential clip is fixed to the radially inner side portion of the back plate.

12. The disc brake pad according to claim 10,
    wherein the circumferential clip is fixed to each of both side portions of the back plate in the circumferential direction.

* * * * *